(12) United States Patent
Cao

(10) Patent No.: US 6,263,129 B1
(45) Date of Patent: Jul. 17, 2001

(54) HIGH-ISOLATION DENSE WAVELENGTH DIVISION MULTIPLEXER UTILIZING A POLARIZATION BEAM SPLITTER, NON-LINEAR INTERFEROMETERS AND BIREFRINGENT PLATES

(75) Inventor: Simon X. F. Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/348,752

(22) Filed: Jul. 6, 1999

(51) Int. Cl.$^7$ ................................................. G02B 6/28
(52) U.S. Cl. ................................................. 385/24
(58) Field of Search ..................... 385/24, 147; 359/349, 359/351, 352, 358; 385/11; 372/6, 26

(56) References Cited

U.S. PATENT DOCUMENTS

| | | | |
|---|---|---|---|
| 4,558,952 | * 12/1985 | Kulesh et al. | 356/349 |
| 5,696,615 | 12/1997 | Alexander | 359/134 |
| 5,748,350 | 5/1998 | Pan et al. | 359/130 |
| 5,883,746 | * 3/1999 | Zelenka | 359/629 |
| 6,031,948 | 2/2000 | Chen | 385/24 |
| 6,085,002 | 7/2000 | Qui et al. | 385/52 |
| 6,125,228 | 9/2000 | Gong | 385/146 |

* cited by examiner

*Primary Examiner*—Akm E. Ullah
(74) *Attorney, Agent, or Firm*—Sawyer Law Group LLP

(57) ABSTRACT

The present invention provides a dense wavelength division multiplexer for separating an optical signal into optical channels. It includes at least one birefringent plate, and a polarization beam splitter optically coupled to the at least one birefringent plate, the polarization beam splitter and at least one birefringent plate for separating one or more of the plurality of optical channels by introducing a phase difference between at least two of the plurality of optical channels, where the separating is based on the polarity of the plurality of optical channels. In a preferred embodiment, the mechanism of separating includes birefringent wedge plates, a polarization beam splitter and two non-linear interferometers, with the birefringent wedge plates disposed between the polarization beam splitter and the input and output paths. The present invention provides an ease in alignment and a higher tolerance to drifts due to the increase in the widths of the pass bands and also provides an improved separation of channels relative to other wavelength division multiplexers employing polarization beam splitters. It may also be easily modified to perform the add/drop function as it separates channels. The materials required to manufacture and implement the dense wavelength division multiplexer in accordance with the present invention are readily available. The present invention thus does not require special or expensive materials or processes. It is thus cost effective.

28 Claims, 15 Drawing Sheets

HIGH-ISOLATION DENSE WAVELENGTH DIVISION MULTIPLEXER UTILIZING A POLARIZATION BEAM SPLITTER, NON-LINEAR INTERFEROMETERS AND BIREFRINGENT PLATES

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed and high data capacity capabilities. Multiple wavelengths may be transmitted along the same optic fiber. This totality of multiple combined wavelengths comprises a single transmitted signal. A crucial feature of a fiber optic network is the separation of the optical signal into its component wavelengths, or "channels", typically by a wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

FIG. 1 illustrates a simplified optical network 100. A fiber optic network 100 could comprise a main loop 150 which connects primary locations, such as San Francisco and New York. In-between the primary locations is a local loop 110 which connects with loop 150 at connector point 140. Thus, if local loop 110 is Sacramento, wavelengths at San Francisco are multiplexed into an optical signal which will travel from San Francisco, add and drop channels with Sacramento's signal at connector point 140, and the new signal will travel forward to New York. Within loop 110, optical signals would be transmitted to various locations within its loop, servicing the Sacramento area. Local receivers (not shown) would reside at various points within the local loop 110 to convert the optical signals into the electrical signals in the appropriate protocol format.

The separation of an optical signal into its component channels is typically performed by a dense wavelength division multiplexer. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new optical signal by the dense wavelength division multiplexer 230. The new signal is then returned to Loop 150 via node D (290). At the same time, $\lambda_1'$ is transferred from path 280-1 to path 250-1. It is combined with the others of Loop 110's channels into a single optical signal by the dense wavelength division multiplexer 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. The opposite is true from Loop 150's frame of reference. This is the add/drop function.

Conventional methods used by wavelength division multiplexers in separating an optical signal into its component channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here.

A problem with the conventional separators is the precision required of a device for transmitting a signal into an optic fiber. A signal entering a wavelength division multiplexer must conform to a set of very narrow pass bands. FIG. 3 shows a sample spectrum curve 310 comprised of numerous channels as it enters a dense wavelength division multiplexer. The pass bands 320 of the channels are very narrow. Ideally, the curve would be a square wave. A narrow pass band is problematic because, due to the physical limitations and temperature sensitivity of signal source laser devices, they never emit light exactly at the center wavelength of an optical filter. The difference between the actual wavelength and the wavelength at the center of the pass band is called the "offset." The amount of offset or change in offset ("drift") ideally should not be larger than the width of the pass bands. Otherwise, crosstalk between channels will be too large. Crosstalk occurs when one channel or part of a channel appears as noise on another channel adjacent to it. Since the signals resulting from the conventional wavelength division multiplexer configurations have narrow pass bands, the signal source devices ("transmitter"), such as lasers or the like, must be of a high precision so that offset or drift is limited to the width of the pass bands. This high precision is difficult to accomplish. Signal transmitting devices of high precision are available but are very expensive. Also, the signal transmitting devices must be aligned individually for each separator, which is time intensive. Additionally, the spectrum of pass bands of conventional separators, such as conventional band pass filter, have rounded shapes. Concatenation of several such filters in series inevitably reduces the overall pass band widths and increases the insertion losses of the filter ensemble because of cancellation of energy at the edges of the overlapping individual pass bands.

A more advanced related art separator utilizing a polarization beam splitter and a non-linear interferometer is disclosed in a co-pending U.S. Patent Application entitled "Non-Linear Interferometer for Fiber Optic Wavelength Division multiplexer Utilizing a Phase Differential Method of Wavelength Separation," Ser. No. 09/247,253, filed on Feb. 10, 1999. Applicant hereby incorporates this patent application by reference.

FIGS. 4 through 6 illustrates a preferred embodiment of the separator disclosed in U.S. patent application Ser. No. 09/247,253. This separator 1000 separates the signal into two sets of channels. FIG. 4 illustrates a top view of a preferred embodiment of a separator 1000. The separator 1000 comprises an optical fiber 1010 for inputting an optical signal and optical fibers 1020 and 1030 for outputting optical signals. As the signal leaves the optic fiber 1010, it diverges. A lens 1050 collimates the signal and directs it towards a beam splitter 1070 which decomposes the signal based upon its polarity. This decomposition takes place at a plane 1075 of the beam splitter 1070. The component (p-component) of the input signal polarized within the plane defined by the input signal's direction of travel and a line perpendicular to junction plane 1075 passes through beam splitter 1070 towards an interferometer 800B. The component (s-component) of the input signal polarized parallel to junction plane 1075 is reflected towards an interferometer 800A. The interferometers 800A and 800B introduce phase differences between the even and odd channels of the signals.

FIG. 5 illustrates the path of the light of the odd channels as it travels through the separator 1000 with the interferometer 800A and 800B of the related art invention. The light of the odd channels travels to the polarization beam splitter 1070 from the input fiber 1010. The light of each channel has an s polarity component ($E_s$) 1110 and a p polarity component ($E_p$) 1220. The $E_s$ and $E_p$ signals may each be decomposed into $E_o$ and $E_e$ components parallel to the principal ray directions of the birefringent elements in interferometer 800A and 800B, respectively. These components are well known in the art and will not further be described here. The vector $E_p$ 1220 is decomposed into components $E_{po}$ 1230 and $E_{pe}$ 1240 whereas the vector $E_s$ 1210 is decomposed into components $E_{so}$ 1250 and $E_{se}$ 1260. This decomposition is illustrated in FIG. 5 for each of the signal polarization component vectors $E_s$ and $E_p$ both before its entry into and after its exit from the interferometer 800A and 800B, respectively. The signal $E_p$ 1220 travels to the interferometer 800B while $E_s$ 1210 travels to interferometer 800A. Both sets of signals are reflected by their interferometers 800A and 800B without a phase shift difference between $E_{so}$ 1250 and $E_{se}$ 1260 (or between $E_{po}$ 1230 and $E_{pe}$ 1240). Thus, both the signal $E_p$ 1220 and the signal $E_s$ 1210 travel back to the polarization beam splitter 1070 without a change in orientation. These signals then travel back through the polarization beam splitter 1070 to output fiber 1020.

FIG. 6 illustrates the path of the even channels as they travel through the separator 1000 with the interferometer 800A and 800B of the present invention. As with the odd channels, the light of the even channels travels to the polarization beam splitter 1070 from the input fiber 1010. The light of each channel has an s polarity component ($E_s$) 1210 and a p polarity component ($E_p$) 1320. As with the odd channels, the $E_s$ and $E_p$ signals may each be decomposed into $E_o$ and $E_e$ components parallel to the principal ray directions of the birefringent elements in interferometer 800A and 800B, respectively. The vector $E_p$ 1320 is decomposed into components $E_{po}$ 1330 and $E_{pe}$ 1340 whereas the vector $E_s$ 1310 is decomposed into components $E_{so}$ 1350 and $E_{se}$ 1360. This decomposition is illustrated in FIG. 6 for the polarization plane of the light of each of the signal vectors $E_s$ and $E_p$ both before its entry into and after its exit from the interferometer 800A and 800B, respectively. The signal $E_p$ 1320 travels to the interferometer 800B while the signal $E_s$ 1310 travels to interferometer 800A. For the even channels, interferometers 800A and 800B introduce a π phase difference between $E_{po}$ 1330 and $E_{pe}$ 1340 and also between $E_{so}$ 1350 and $E_{se}$ 1360 respectively. This phase difference causes an effective π/2 rotation of each of the signals 1310 and 1320, thereby converting them from $E_s$ into $E_p$ and from $E_p$ into $E_s$, respectively. When both of these signals travel through beam splitter 1070 again, this rotation causes them to travel to output fiber 1030. Thus, in this manner, output fiber 1020 contains the odd channels while output fiber 1030 contains the even channels.

This separator has advantages over conventional separators in terms of increased widths and flatness of the pass bands and isolation bands and greater ease of alignment. Although the separator 1000 is useful for its stated purpose, it may be limited, in some cases, by the properties of the polarization beam splitter used 1070. A perfect polarization beam splitter will separate an incident unpolarized light beam into two plane polarized component light beams with mutually perpendicular polarization orientations such that each component beam comprises 100% of the light of one polarization orientation and none of the light of the other orientation. However, in real beam splitters, which can never be perfect, there is always a small amount of leakage of light rays of one polarization orientation into the pathway nominally comprised only of light with the other polarization orientation. Because of this leakage, there will be imperfect isolation of one set of signals from another in the separator 1000.

Accordingly, there exists a need for a separation mechanism which would allow a wavelength division multiplexer to have a greater tolerance for wavelength offset and drift and a greater ease of alignment than is realized by conventional separators and also a greater degree of isolation between the two sets of separated channels. The present invention addresses such a need.

SUMMARY OF THE INVENTION

The present invention provides a dense wavelength division multiplexer for separating an optical signal into optical channels. It includes at least one birefringent plate, and a polarization beam splitter optically coupled to the at least one birefringent plate, the polarization beam splitter and at least one birefringent plate for separating one or more of the plurality of optical channels by introducing a phase difference between at least two of the plurality of optical channels, where the separating is based on the polarity of the plurality of optical channels. In a preferred embodiment, the mechanism of separating includes birefringent wedge plates, a polarization beam splitter and two non-linear interferometers, with the birefringent wedge plates disposed between the polarization beam splitter and the input and output paths. The present invention provides an ease in alignment and a higher tolerance to drifts due to the increase in the widths of the pass bands and also provides an improved separation of channels relative to other wavelength division multiplexers employing polarization beam splitters. It may also be easily modified to perform the add/drop function as it separates channels. The materials required to manufacture and implement the dense wavelength division multiplexer in accordance with the present invention are readily available. The present invention thus does not require special or expensive materials or processes. It is thus cost effective.

DETAILED DESCRIPTION OF THE INVENTION

The present invention relates to an improvement in the separation mechanism to be used in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 7 through 15 in conjunction with the discussion below.

Figure 1:
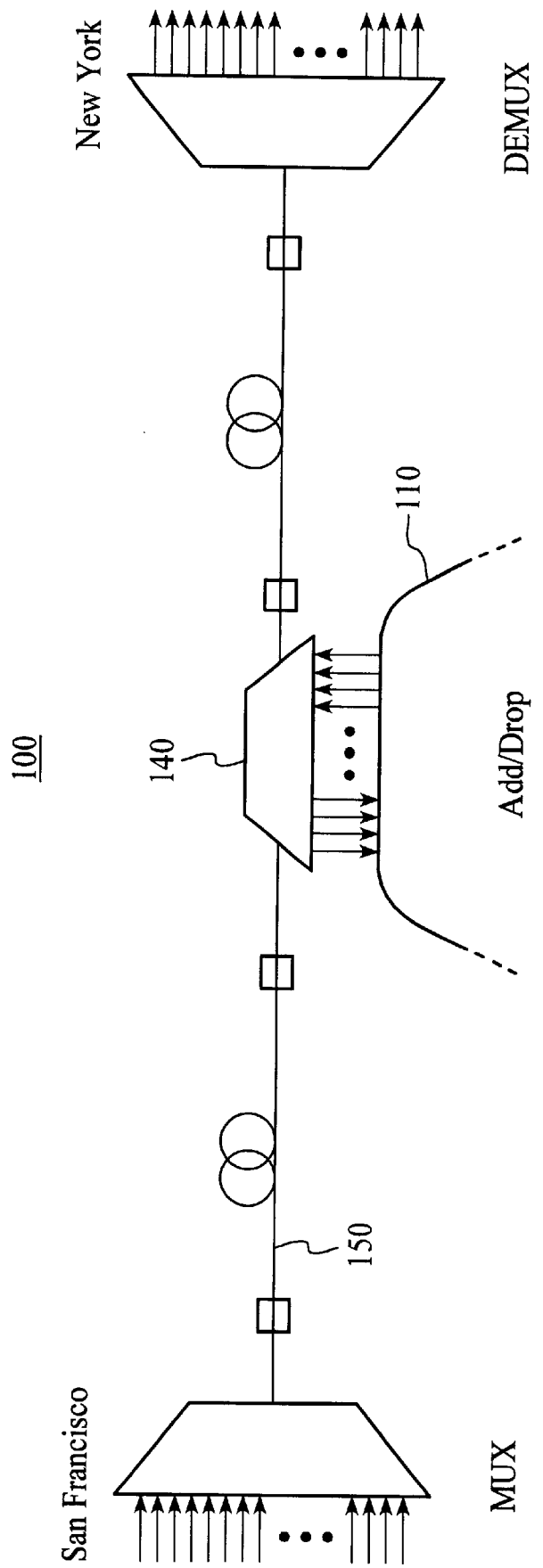
FIG. 1 is an illustration of a simplified optical network.
Figure 2:
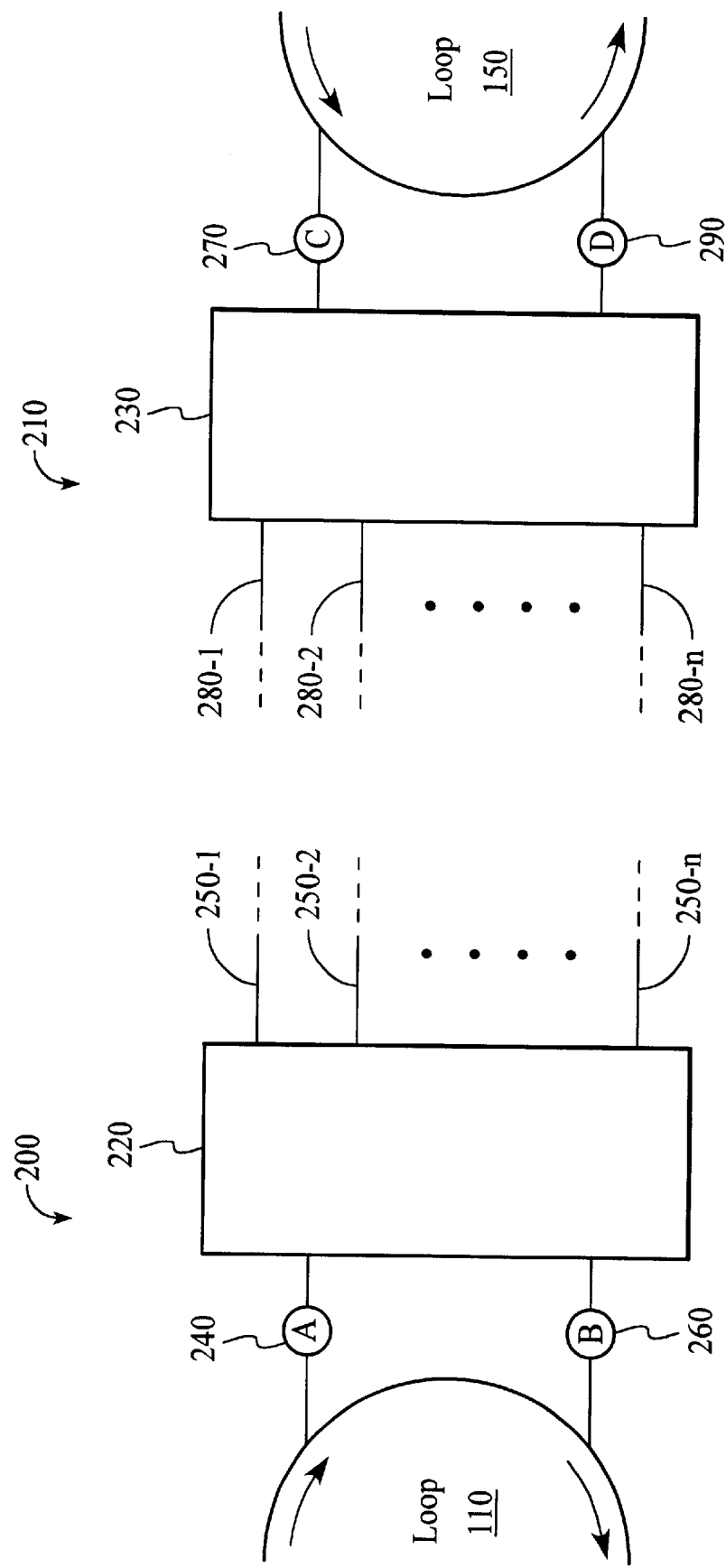
FIG. 2 is an illustration of conventional add/drop systems and dense wavelength division multiplexers.
Figure 3:
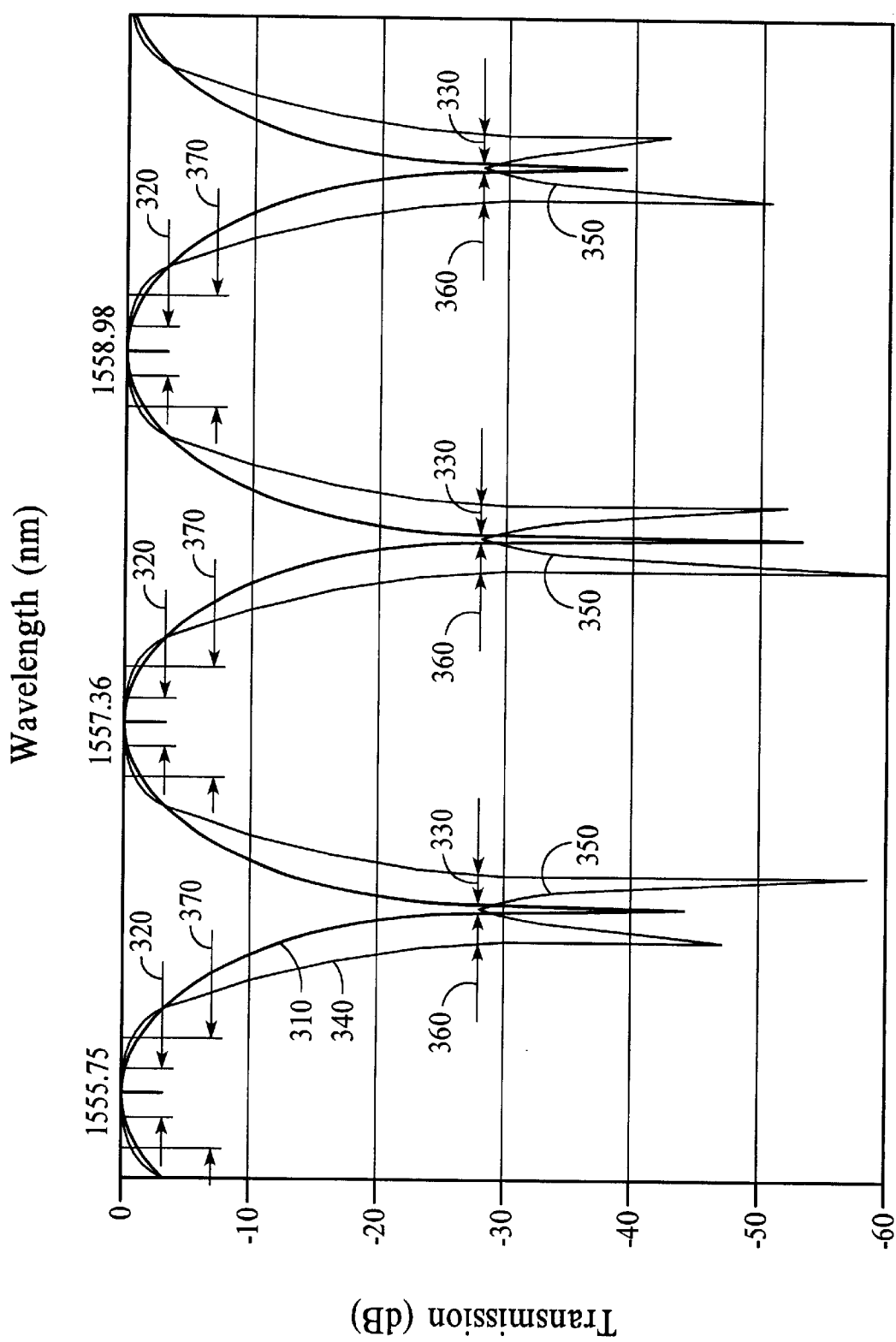
FIG. 3 is a graph of two sample spectrum curves, each comprised of several channels, as thy enter, respectively, a conventional wavelength division multiplexer and a dense wavelength division multiplexer in accordance with the present invention.
Figure 4:
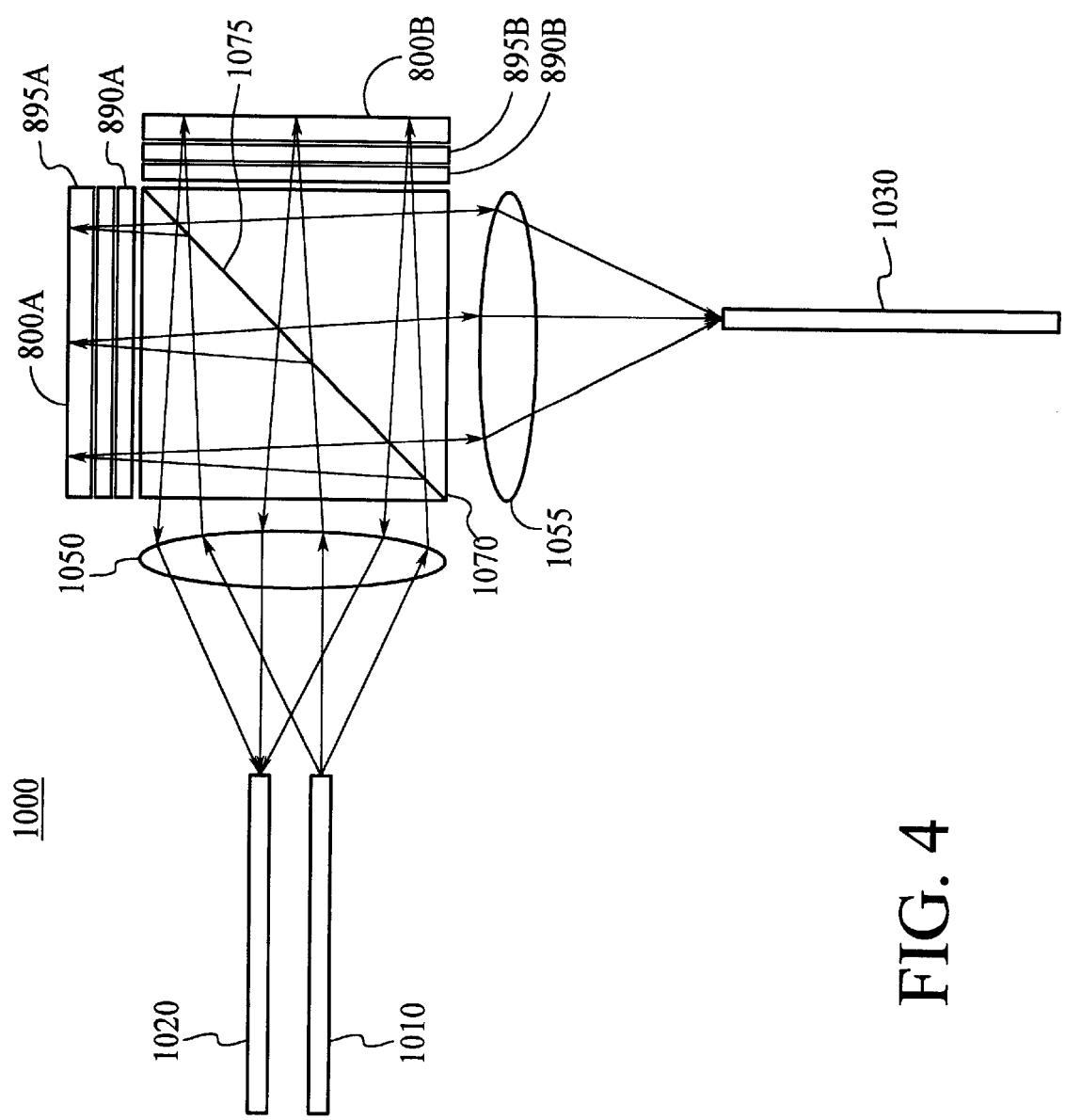
FIG. 4 is an illustration of an embodiment of a separator utilizing a polarization beam splitter and non-linear interferometers.
Figure 5:
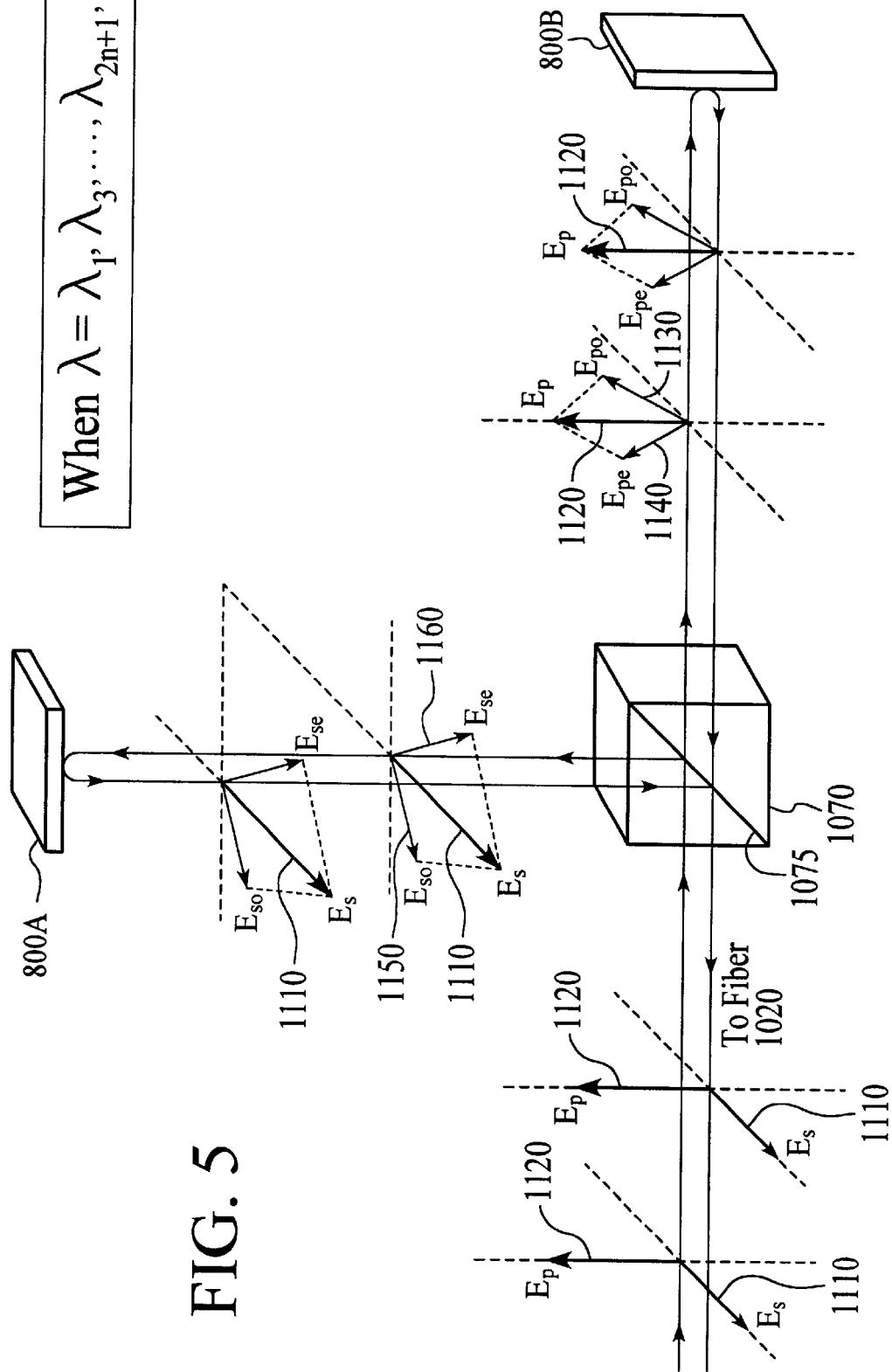
FIG. 5 is an illustration of odd channels as they travel through the separator of FIG. 4.
Figure 6:
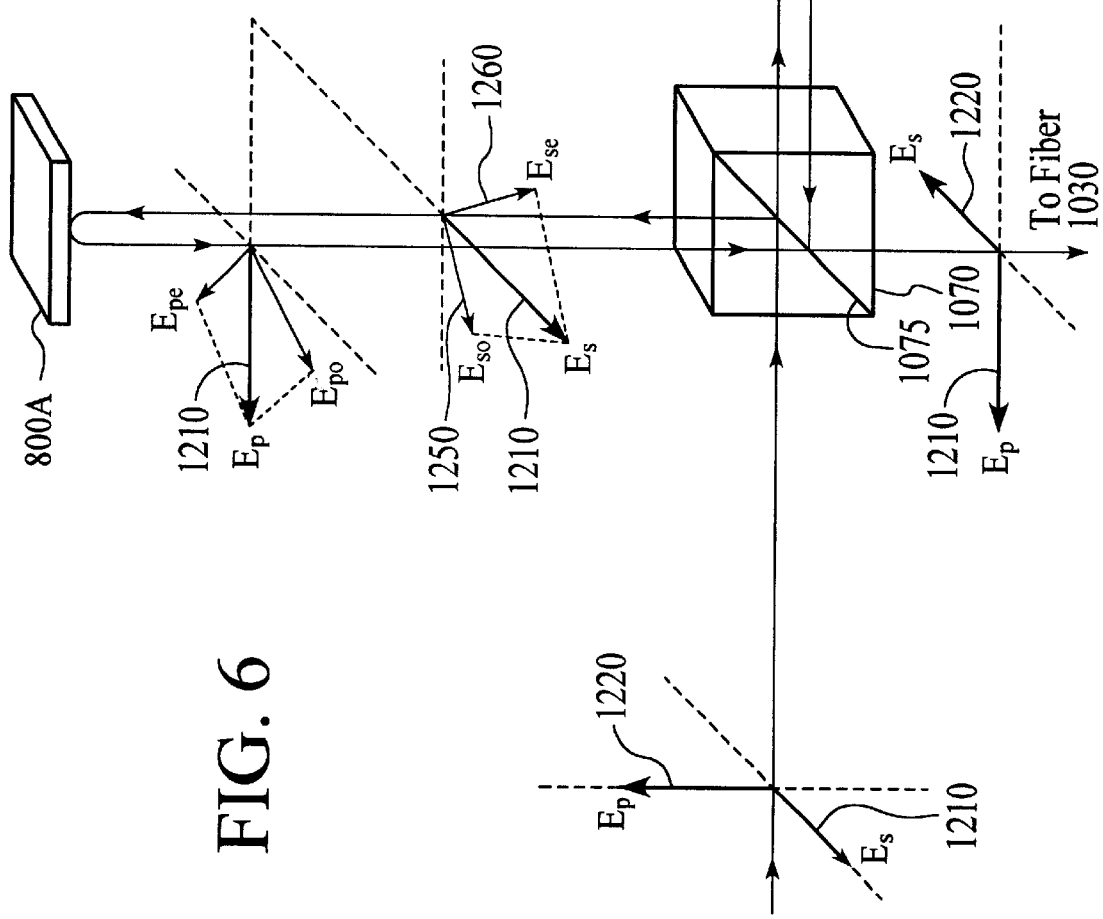
FIG. 6 is an illustration of even channels as they travel through the separator of FIG. 4.
Figure 7:
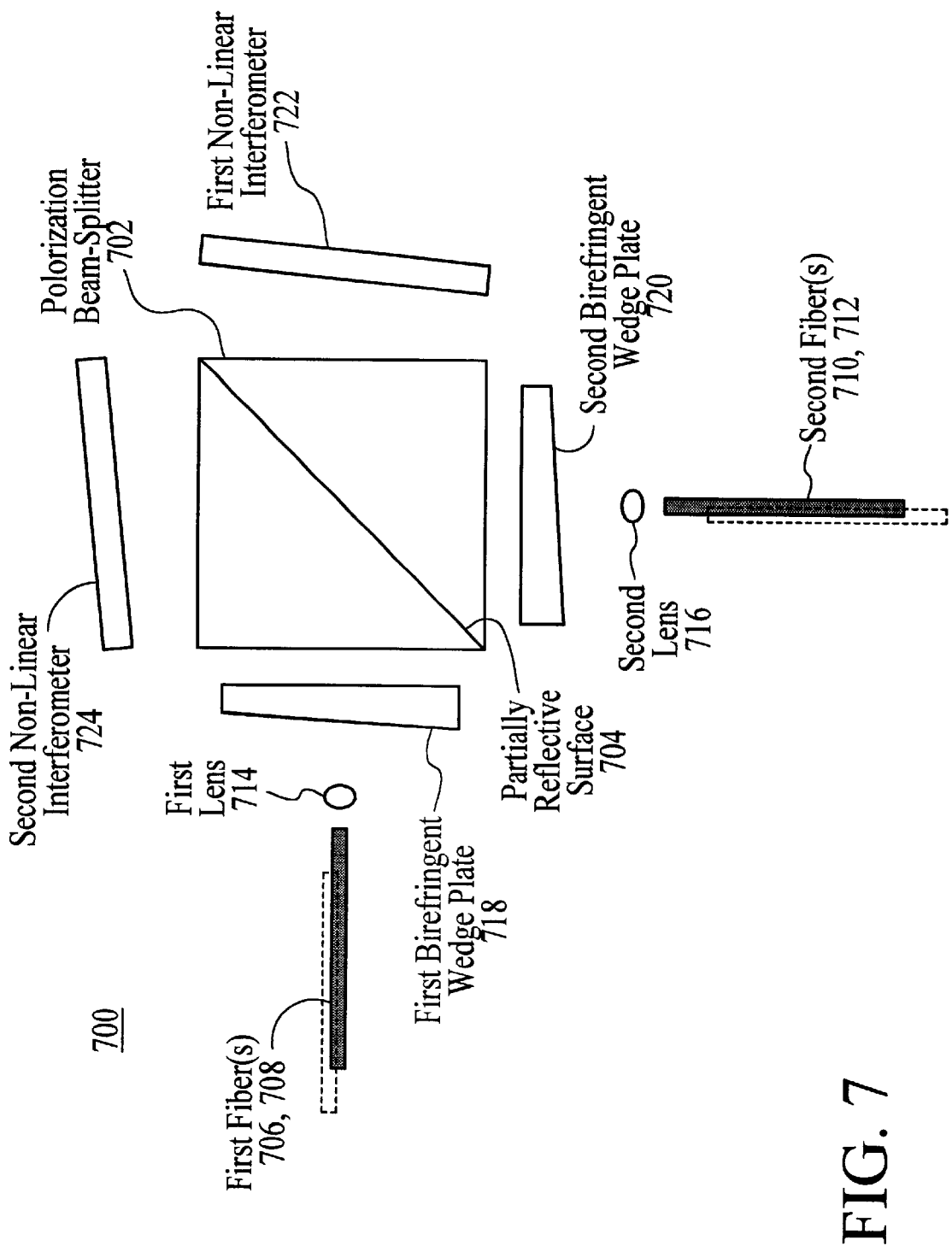
FIG. 7 is a top view of a preferred embodiment of a separator in accordance with the present invention.

FIG. 7 shows a top view of a preferred embodiment of the separator of the present invention. The separator 700 comprises a polarization beam splitter 702 with a partially reflective surface 704 contained within polarization beam splitter 702. Although polarization beam splitter 702 is drawn as a cube-type beam splitter in this and other figures, one of ordinary skill in the art will understand that other types of polarization beam splitters could be employed without departing from the spirit and scope of the present invention. Surface 704 either reflects or transmits plane polarized light rays depending upon whether the direction of polarization is parallel to surface 704 or contained within the plane of incidence of the rays, respectively. The well-known designations s-polarization and p-polarization are used to refer to these two polarization types, respectively.

The polarization beam splitter 702 also comprises a pair of optical fibers 706 and 708 disposed side by side such that they are parallel to each other and disposed to one side of the beam splitter 702. Fibers 706 and 708 comprise a first input and a first output fiber, respectively. Likewise, fibers 710 and 712 are a second pair of optical fibers disposed side by side such that they are parallel to each other and disposed to a second side of beam splitter 702. Fiber 710 and 712 comprise a second input and a second output fiber, respectively. The input fiber 710 need not be present for simple separator applications. The end faces of all fibers 706–712 are polished flat and these polished faces are disposed in the direction of the polarization beam splitter 702.

A first lens 714 and a second lens 716 are disposed adjacent to the end faces of the pair of fibers 706 and 708 and the pair of fibers 710 and 712, respectively, such that each lens is between its neighboring fibers and the polarization beam splitter 702 and the distance between each lens and the adjacent pair of fibers is the lens focal length, f. A first birefringent wedge plate 718 and a second birefringent wedge plate 720 are disposed between the polarization beam splitter and the lens 714 and 716, respectively. Also, a first non-linear interferometer 722 and a second non-linear interferometer 724 are disposed adjacent to polarization beam splitter 702 along sides thereof that are opposite to, respectively, the pair of fibers 706 and 708 and the pair of fibers 710 and 712. As described in more detail below, each of the non-linear interferometers 722 and 724 are tilted at a slight angle relative to planes perpendicular to the common axis of the pair of fibers 706 and 708 and the common axis of the pair of fibers 710 and 712, respectively. The values of these angles are determined by the light pathways through the separator 700 as described in more detail below.

Figure 8:
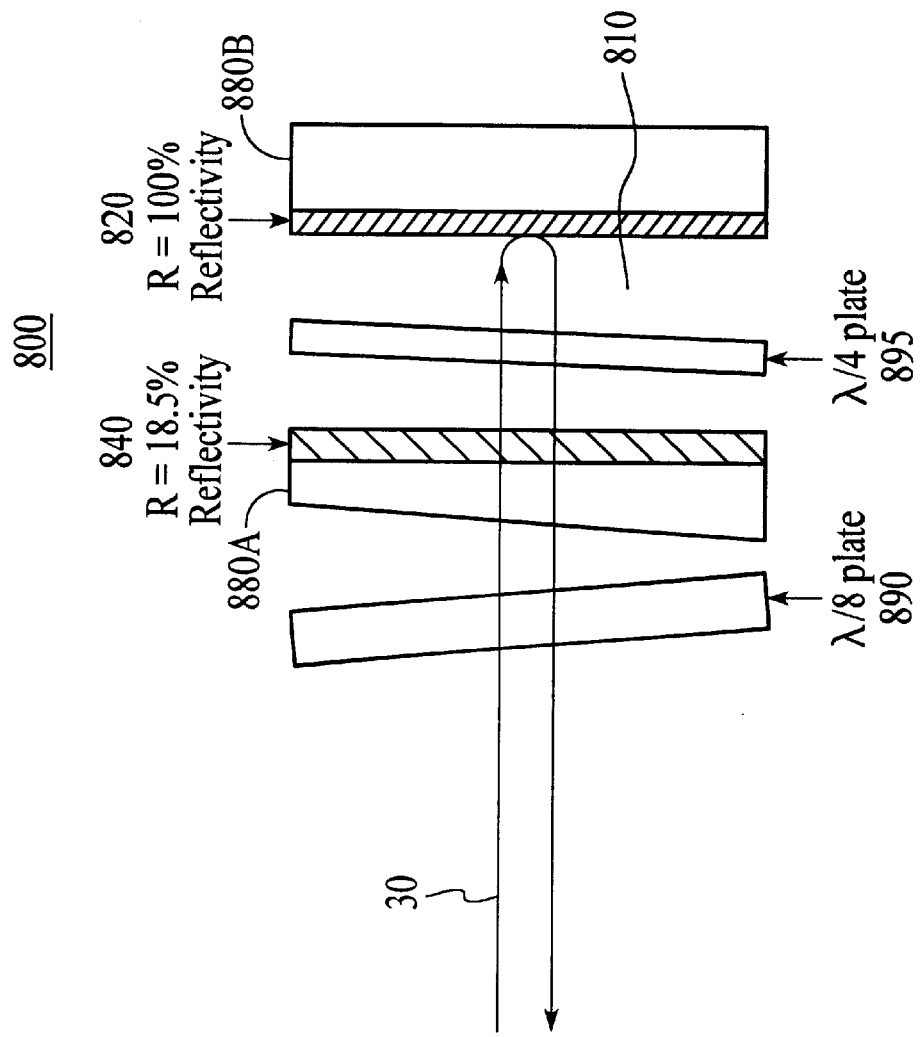
FIG. 8 is an illustration of a preferred embodiment of a nonlinear interferometer used with the separator of the present invention.

The first non-linear interferometer 722 and the second non-linear interferometer 724 are identical to one another and are two instances of an invention disclosed in the above-mentioned co-pending U.S. patent application Ser. No. 09/247,253. FIG. 8 illustrates a preferred embodiment of an interferometer described in this Patent Application. The interferometer 800 comprises two parallel glass plates 880A and 880B with a space or cavity 810 therebetween. The inside face of the glass plate 880B is coated with a layer of reflective coating 820 with a reflectivity preferably of 100%. The inside face of the glass plate 880A is coated with a layer of reflective coating 840 with a reflectivity preferably of approximately 18%. A quarter-wave plate 895 is disposed within the space 810 and an eighth-wave plate 890 is disposed adjacent to plate 880A and external to the space 810.

When signal 30 enters the interferometer 800, it passes through the 18% reflective coating 840 and a waveplate 895 preferably of λ/4. The λ/4 plate 895 introduces an 180° round trip phase change between an o-beam and e-beam of the signal inside the cavity 810, and the external λ/8 plate 890 introduces the round trip 90° phase change between the o-beam and e-beam. The waveplate 890, preferably of λ/8, fine tunes the shape of the signal 30.

Returning to FIG. 7, both of the non-linear interferometers 722 and 724 act as 100% reflectors for incident light beams. Furthermore, both non-linear interferometers 722 and 724 have the additional property that, if the light beam reflected therefrom is an optical signal comprised of a plurality of channels evenly spaced in wavelength and the light of each channel is plane polarized, then the light of every second channel is reflected with a 90° rotation of its polarization plane direction whilst the light of each remaining channel is reflected with unchanged polarization.

In the following discussion, the channels whose light rays experience 90° polarization-plane rotation are arbitrarily referred to as even channels and the remaining channels are referred to as odd channels. The use of such terminology, i.e., "even channels" or "odd channels" in this document is made for the convenience of the reader only and does not imply restriction of the present invention to any particular optical channel wavelength distribution, wavelength spacing or enumeration scheme. Adaptation of the present invention for use with any one of numerous optical channel configurations and or systems will be understood by one of ordinary skill in the art and is within the scope and spirit of the present invention. Furthermore, it will be understood by one of ordinary skill in the art that the non-linear interferometer comprising this invention may also be constructed so as to rotate polarization planes of light rays of the "odd channels" instead of those of light rays of the "even channels" without departing from the scope or spirit of the present invention. Such modifications are readily performed, for instance, by adjusting the properties of the non-linear interferometer and are within the scope and spirit of the present invention.

The operation of the separator 700 is now first described with reference to FIG. 9 and FIG. 10 which describe the paths of light rays input from the first input fiber 706 and comprising odd and even channels, respectively, through the separator 700. These figures illustrate the pathways and polarization states of light of signals and sub-signals traversing through separator 700. In both FIG. 9 and FIG. 10, as well as in FIG. 12 and FIG. 13 following, double-headed arrows within circles are parallel to the polarization directions of plane polarized light that is polarized within the plane of the paper and crosses within circles represent plane polarized light that is polarized perpendicular to the plane of the paper. With specific reference to FIG. 9, signal light 902 of an odd channel emanating from fiber 706 is collimated by the lens 714 and then split into two plane polarized sub-signals, a less greatly defected ray 904 and a more greatly defected ray 906, by the first birefringent wedge 718. In this example, the polarization of the ray 904 is oriented in a direction perpendicular to the paper and that of the ray 906 is oriented parallel to the left edge of the paper. The optical axes of wedge 718 are aligned such that the light rays of sub-signal 904 and of sub-signal 906 have s-polarization and p-polarization, respectively, with reference to the partially reflective surface 704. Most of the s-polarized sub-signal ray 904 is reflected at surface 704 so as to produce reflected ray 904A. Likewise, most of the p-polarized sub-signal ray 906 is transmitted through surface 704 so as to produce transmitted ray 906A. If the polarization splitting of polarization beam splitter 702 were perfect, then sub-signal 904A would comprise 100% of the intensity of sub-signal 904 and sub-signal 906A would comprise 100% of the intensity of sub-signal 906. However, since polarization beam splitter 702 will, in general, not be perfect, there exists a small portion, sub-signal 904B, of sub-signal 904 that is transmitted through surface 704 and another small portion, sub-signal 906B, of sub-signal 906 that is reflected at surface 704. Thus, there exist two transmitted sub-signals, 904B and 906A and two reflected sub-signals 904A and 906B.

Figure 9:
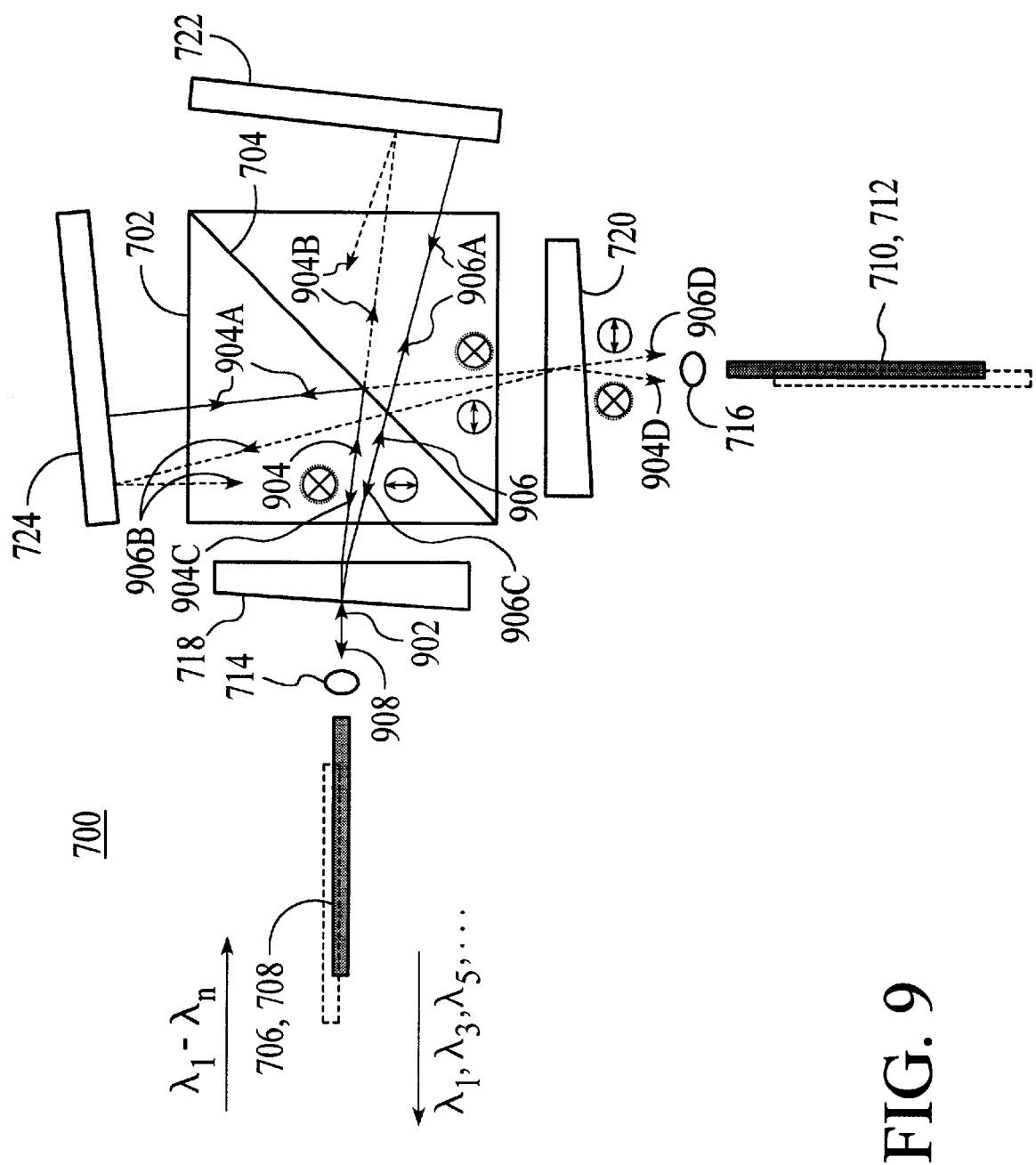
FIG. 9 is an illustration of the optical paths through the preferred embodiment of the separator of light signals and sub-signals input from the first input fiber and corresponding to the paths of light signals of odd channels in accordance with the present invention.

As shown in FIG. 9, the two transmitted sub-signals, 904B and 906A travel through polarization beam splitter 702 to the first non-linear interferometer 722. The two reflected sub-signals, 904A and 906B travel through polarization beam splitter 702 to the second non-linear interferometer 724. Light rays of sub-signals 906A and 904A, which comprise the bulk of the transmitted intensity and reflected intensity, respectively, have the desired respective p- and s-polarizations appropriate for operation of a perfect polarization beam splitter. Conversely, the weaker intensity light rays of sub-signals 904B and 906B have undesired s-and p-polarizations, respectively, which result from the imperfect character of beam splitter 702.

Both non-linear interferometers 722 and 724 reflect 100% of the signal light that enters them. After interacting with one or the other of the non-linear interferometers, each of the sub-signals 904A, 904B, 906A, and 906B therefore propagates along its return or reverse path. The first non-linear interferometer 722 and the second non-linear interferometer 724 are aligned such that their reflective surfaces are perpendicular to sub-signals 906A and 904A, respectively. Therefore, sub-signals 906A and 904A are both reflected backward 180° so that their return pathways re-trace their respective forward pathways. Because these sub-signals 906A and 904A are of an odd-channel wavelength, there is no polarization plane rotation of the light rays of either upon reflection at its respective interferometer 722 or 724. Thus, after reflection, the light rays of sub-signals 906A and 904A maintain their p- and s-polarization character, respectively. Because the light rays of the return portion of sub-signal 906A are p-polarized with respect to polarization beam splitter 702, a new sub-signal 906C comprised of p-polarized light and comprising a large portion of the intensity of sub-signal 906A is transmitted through reflective surface 704. Likewise, because the light of the return portion of sub-signal 904A are s-polarized with respect to polarization beam splitter 702, a new sub-signal 904C comprised of s-polarized light and comprising a large portion of the intensity of sub-signal 904A is reflected at surface 704.

Both the sub-signals 904C and 906C retrace, in the reverse direction, the original paths of sub-signals 904 and 906, respectively, and are thus directed to and through the first birefringent wedge 718. Upon passing through the first birefringent wedge 718, sub-signals 904C and 906C re-trace the same pathways as sub-signals 904 and 906, respectively, but in the reverse direction. Furthermore, sub-signals 904C and 906C have the same respective polarization plane directions as sub-signals 904 and 906. Thus, in traversing through birefringent wedge 718, both sub-signals 904C and 906C are recombined so as to create the output signal 908. The signal 908 retraces the original pathway of the incoming or forward propagating portion of signal 902 and is thus transmitted through and focussed by lens 714. Output fiber 708 is aligned such that the focussed signal 908 is captured by output fiber 708. In this way, most of the intensity of odd-channel signals emanating from input fiber 706 is captured by output fiber 708.

The sub-signals 904B and 906B comprise a small portion of signal light intensity. Because sub-signals 904B and 906B propagate at small deflection angles relative to sub-signals 906A and 904A, respectively, and because the reflective surfaces of non-linear interferometers 722 and 724 are perpendicular to the ray paths of 906A and 904A, respectively, the return portions of sub-signals 904B and 906B do not re-trace their original paths through polarization beam splitter 702. The change in path, for the return versus the original portion of each of the sub-signals 904B and 906B, is such that neither of these sub-signals is captured by either output fiber 708 or 712 regardless of any transmission through or rejection at the plane 704. Both sub-signals 904B and 906B are thus lost from the system.

Furthermore, because polarization beam splitter 702 is not perfect, a small portion, sub-signal 906D, of the p-polarized return portion of sub-signal 906A is reflected at surface 704 and a small proportion, sub-signal 904D, of the s-polarized return portion of sub-signal 904A is transmitted through surface 704. Both the sub-signal 906D comprised of p-polarized light and the sub-signal 904D comprised of s-polarized light travel towards and through the second birefringent wedge plate 720. The second birefringent plate 720 is oriented such that p-polarized and s-polarized rays propagate therethrough as less greatly defected and more greatly defected rays, respectively. Thus, sub-signal 906D and 904D propagate through the second birefringent wedge plate 720 as a less greatly deflected ray and as a more greatly deflected ray, respectively. As illustrated in FIG. 9, these ray paths are such that neither sub-signal 906D nor sub-signal 904D enter fiber 712. In this way, as well as by the elimination of sub-signals 904B and 906B, odd channel signals emanating from input fiber 706 are completely prevented from entering the output fiber 712.

The operation of separator 700 is now discussed with reference to FIG. 10 for even channels input from first input fiber 706. Signal light 1002 of an even channel emanating from fiber 706 is collimated by the lens 714 and then split into two linearly polarized sub-signals, a less greatly defected ray 1004 and a more greatly defected ray 1006, by the first birefringent wedge 718. The optical axes of wedge 718 are aligned such that the light of sub-signal 1004 and of sub-signal 1006 have s-polarization and p-polarization, respectively, with reference to the partially reflective surface 704. In this example, the polarization of the ray 1004 is oriented in a direction perpendicular to the plane of the paper and that of the ray 1006 is oriented parallel to the left edge of the paper. Most of the s-polarized sub-signal ray 1004 is reflected at surface 704 so as to produce reflected ray 1004A. Likewise, most of the p-polarized sub-signal ray 1006 is transmitted through surface 704 so as to produce transmitted ray 1006A. As discussed above, there is also a small portion, sub-signal 1004B, of sub-signal 1004 that is transmitted through surface 704 and another small portion, sub-signal 1006B, of sub-signal 1006 that is reflected at surface 704. Thus, there exist two transmitted sub-signals, 1004B and 1006A and two reflected sub-signals 1004A and 1006B.

Figure 10:
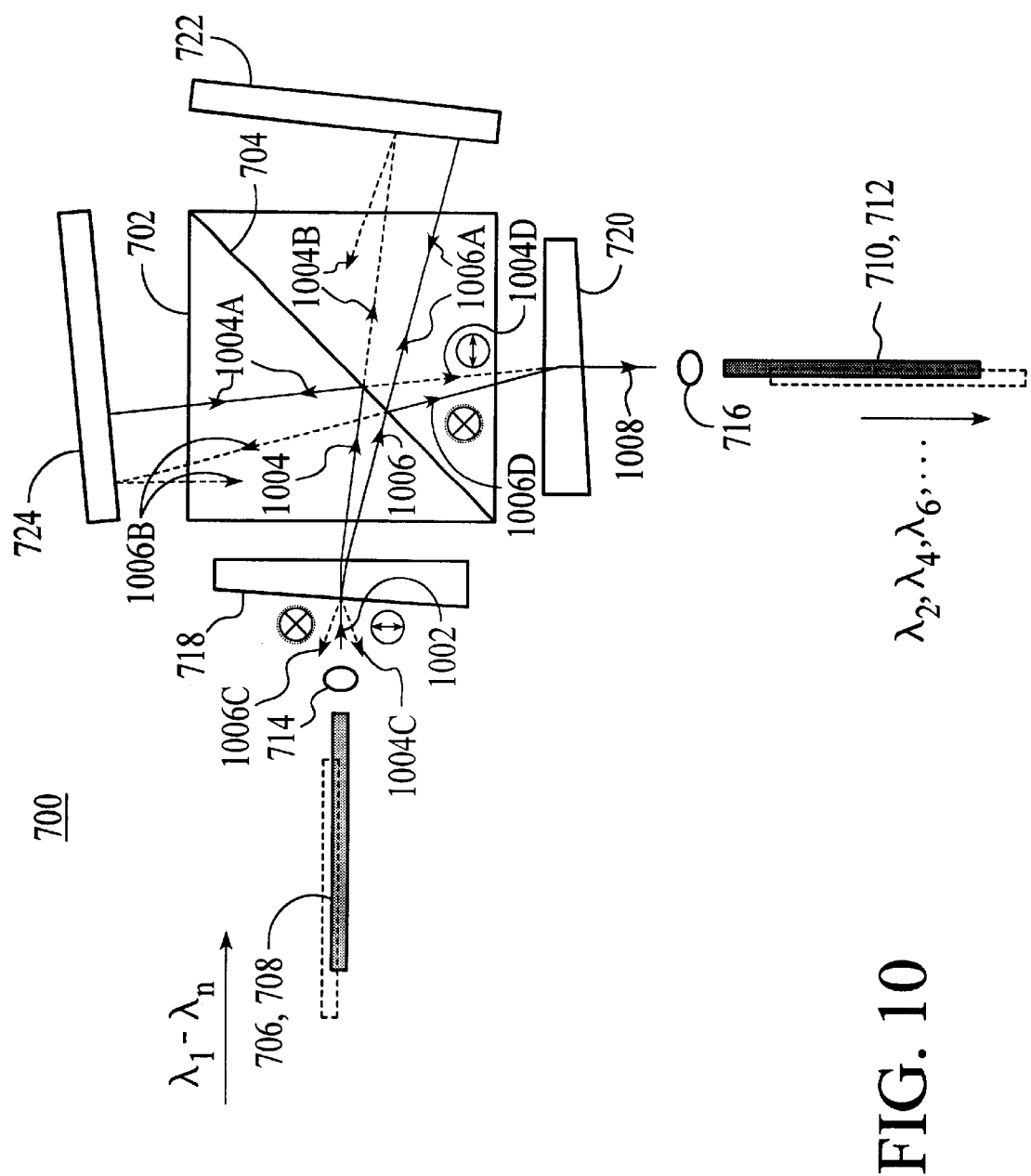
FIG. 10 is an illustration of the optical paths through the preferred embodiment of the separator of light signals and sub-signals input from the first input fiber and corresponding to the paths of light signals of even channels in accordance with the present invention.

As shown in FIG. 10, the two transmitted sub-signals, 1004B and 1006A travel through polarization beam splitter 702 to the first non-linear interferometer 722. The two reflected sub-signals, 1004A and 1006B travel through polarization beam splitter 702 to the second non-linear interferometer 724. The light rays of sub-signals 1006A and 1004A, which comprise the bulk of the transmitted intensity and reflected intensity, respectively, have the desired respective p- and s-polarizations appropriate for operation of a perfect polarization beam splitter. Conversely, the light rays of the weaker intensity sub-signals 1004B and 1006B have undesired s- and p-polarizations, respectively, which result from the imperfect character of beam splitter 702.

Both non-linear interferometers 722 and 724 reflect 100% of the signal light that enters them. After interacting with one or the other of the non-linear interferometers, each of the sub-signals 1004A, 1004B, 1006A, and 1006B therefore propagates along its return or reverse path. The first non-linear interferometer 722 and the second non-linear interferometer 724 are aligned such that their reflective surfaces are perpendicular to sub-signals 1006A and 1004A, respectively. Therefore, sub-signals 1006A and 1004A are both reflected backward 180° so that their return pathways re-trace their respective forward pathways. Because these sub-signals 1006A and 1004A are of an even-channel wavelength, each incurs a 90° polarization-plane rotation upon reflection at its respective interferometer 722 or 724. Thus, after reflection, the light of sub-signals 1006A and 1004A has s- and p-polarization character, respectively. Because the light of the return portion of sub-signal 1006A is s-polarized with respect to polarization beam splitter 702, a new sub-signal 1006D comprised of s-polarized light and comprising a large portion of the intensity of sub-signal 1006A is reflected at surface 704. Likewise, because the light of the return portion of sub-signal 1004A is p-polarized with respect to polarization beam splitter 702, a new sub-signal 1004D comprised of p-polarized light and comprising a large portion of the intensity of sub-signal 1004A is transmitted through surface 704. Both sub-signals 1004D and 1006D are thus directed to and through the second birefringent wedge plate 720. The second birefringent plate 720 is oriented such that p-polarized and s-polarized rays propagate therethrough as less greatly defected and more greatly defected rays, respectively. Thus, in traversing through second birefringent wedge plate 720, sub-signal 1004D and sub-signal 1006D propagate as a less greatly deflected ray and as a more greatly deflected ray, respectively. The ray paths of sub-signals 1004D and 1006D are such that these two sub-signals are recombined so as to create the output signal 1008. The signal 1008 is transmitted through and focussed by lens 716. Output fiber 712 is aligned such that the focused signal 1008 is captured by output fiber 712. In this way, most of the intensity of even-channel signals emanating from input fiber 706 is captured by output fiber 712.

The sub-signals 1004B and 1006B comprise a small portion of signal light intensity. Because sub-signals 1004B and 1006B propagate at small deflection angles relative to sub-signals 1006A and 1004A, respectively, and because the reflective surfaces of non-linear interferometers 722 and 724 are perpendicular to the ray paths of 1006A and 1004A, respectively, the return portions of sub-signals 1004B and 1006B do not re-trace their original paths through polarization beam splitter 702. The change in path, for the return versus the original portion of each of the sub-signals 1004B and 1006B, is such that neither of these sub-signals is captured by either output fiber 708 or 712 regardless of any transmission through or relection at the plane 704. Both sub-signals 1004B and 1006B are thus lost from the system. Furthermore, because polarization beam splitter 702 is not perfect, a small portion, sub-signal 1006C, of the s-polarized return portion of sub-signal 1006A is transmitted through surface 704 and a small portion, sub-signal 1004C, of the p-polarized return portion of sub-signal 1004A is reflected at surface 704. Both the sub-signal 1006C comprised of s-polarized light and the sub-signal 1004C comprised of p-polarized light travel towards and through the first birefringent wedge plate 718. The orientation of wedge plate 718 is such that that p-polarized and s-polarized rays propagate therethrough as more greatly defected and less greatly defected rays, respectively. Thus, sub-signal 1004C and 1006C propagate through the first birefringent wedge plate 718 as a more greatly deflected ray and as a less greatly deflected ray, respectively. As illustrated in FIG. 10, these ray paths are such that neither sub-signal 1004C nor sub-signal 1006C enter fiber 708. In this way, as well as by the elimination of sub-signals 1004B and 1006B, even channel signals emanating from input fiber 706 are completely prevented from entering the output fiber 708.

Figure 11:
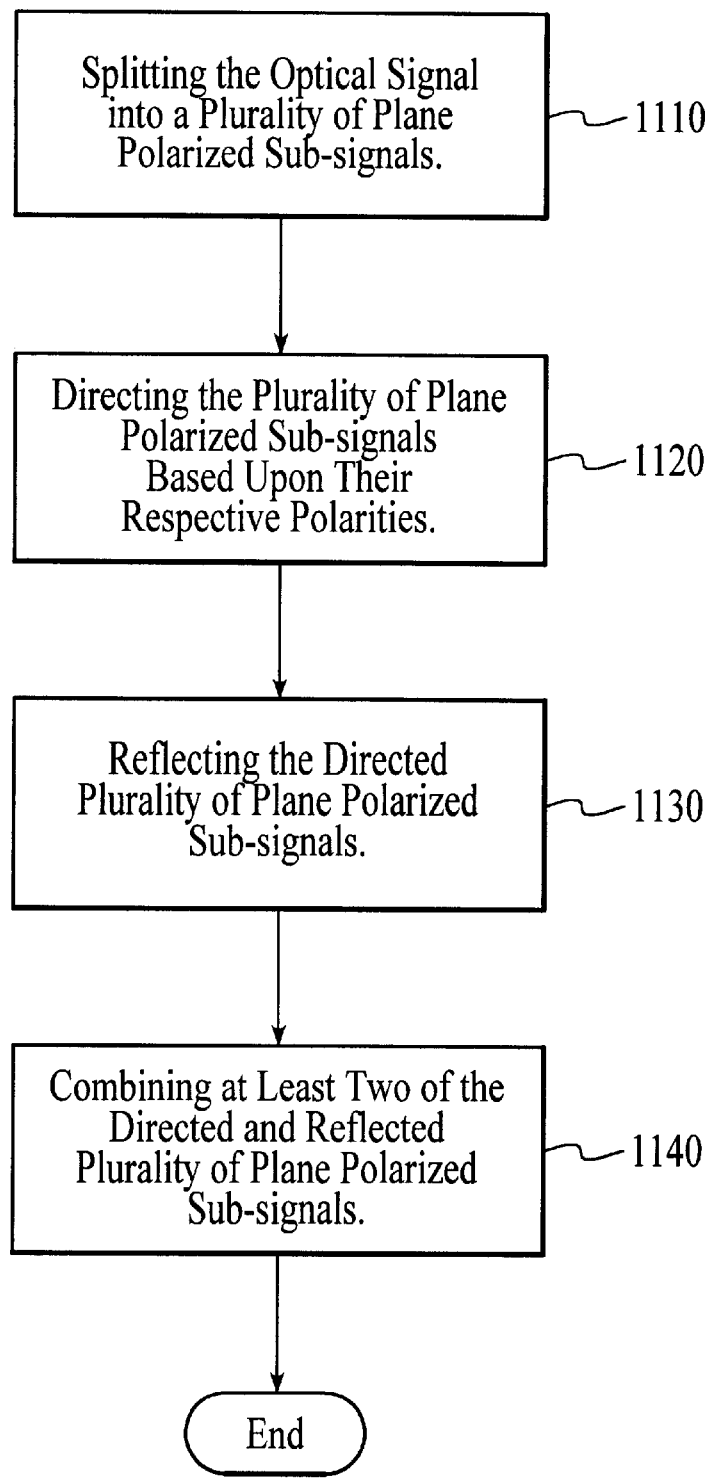
FIG. 11 is a flow chart illustrating a preferred embodiment of a method for separating an optical signal in accordance with the present invention.

FIG. 11 is a flow chart illustrating a preferred embodiment of a method for separating an optical signal in accordance with the present invention. First, the optical signal is split into a plurality of plane polarized sub-signals, via step 1110. Next, the plurality of plane polarized sub-signals are directed based upon their respective polarities, via step 1120. Then, they are reflected, via step 1130. The reflected sub-signals are then combined, via step 1140.

The operation of the separator 700 utilizing the method described in FIG. 11 is now described with reference to FIGS. 12 and 13 which describe the paths of light rays input from the second input fiber 710 and comprising odd and even channels, respectively, through the separator 700. With specific reference to FIG. 12, signal light 1202 of an odd channel emanating from fiber 710 is collimated by the lens 716 and then split into two plane polarized sub-signals, a less greatly defected ray 1204 and a more greatly defected ray 1206, by the second birefringent wedge 720, via step 1110. The optical axes of wedge 720 are aligned such that the light rays of sub-signal 1204 and of sub-signal 1206 have p-polarization and s-polarization, respectively, with reference to the partially reflective surface 704. In this example, the polarization of the ray 1204 is oriented parallel to the bottom edge of the paper and that of the ray 1206 is oriented perpendicular to the plane of the paper. Most of the p-polarized sub-signal ray 1204 is transmitted through surface 704 so as to produce transmitted ray 1204A. Likewise, most of the s-polarized sub-signal ray 1206 is reflected at surface 704 so as to produce reflected ray 1206A. If the polarization splitting of polarization beam splitter 702 were perfect, then sub-signal 1204A would comprise 100% of the intensity of sub-signal 1204 and sub-signal 1206A would comprise 100% of the intensity of sub-signal 1206. However, since polarization beam splitter 702 will, in general, not be perfect, there exists a small portion, sub-signal 1204B, of sub-signal 1204 that is reflected at surface 704 and another small portion, sub-signal 1206B, of sub-signal 1206 that is transmitted through surface 704. Thus, there exist two transmitted sub-signals, 1204A and 1206B and two reflected sub-signals 1204B and 1206A, via step 1120.

Figure 12:
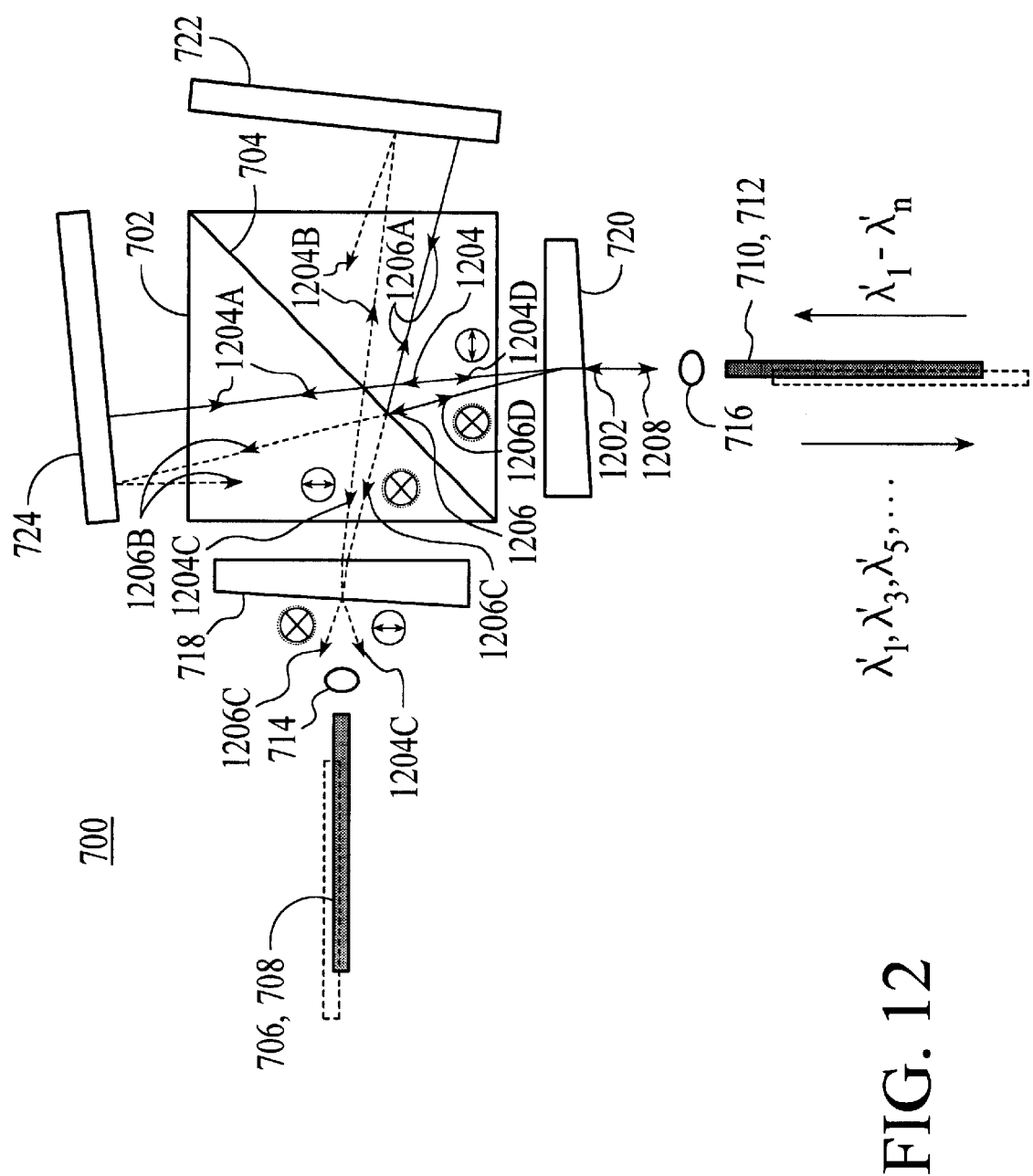
FIG. 12 is an illustration of the optical paths through the preferred embodiment of the separator of light signals and sub-signals input from the second input fiber and corresponding to odd channels in accordance with the present invention.

As shown in FIG. 12, the two transmitted sub-signals, 1204A and 1206B travel through polarization beam splitter 702 to the second non-linear interferometer 724. The two reflected sub-signals, 1204B and 1206A are reflected at polarization beam splitter 702 to the first non-linear interferometer 722. The light rays of sub-signals 1204A and 1206A, which comprise the bulk of the transmitted intensity and reflected intensity, respectively, have the desired respective p- and s-polarizations appropriate for operation of a perfect polarization beam splitter. Conversely, the light rays of the weaker intensity sub-signals 1206B and 1204B have undesired s-and p-polarizations, respectively, which result from the imperfect character of beam splitter 702.

Both non-linear interferometers 722 and 724 reflect 100% of the signal light that enters them, via step 1130. After interacting with one or the other of the non-linear interferometers, each of the sub-signals 1204A, 1204B, 1206A, and 1206B therefore propagates along its return or reverse path. The first non-linear interferometer 722 and the second non-linear interferometer 724 are aligned such that their reflective surfaces are perpendicular to sub-signals 1206A and 1204A, respectively. Therefore, sub-signals 1206A and 1204A are both reflected backward 180° so that their return pathways re-trace their respective forward pathways. Because these sub-signals 1206A and 1204A are of an odd-channel wavelength, there is no polarization plane rotation of the lights rays of either upon reflection at its respective interferometer 722 or 724. Thus, after reflection, the light rays of sub-signals 1206A and 1204A maintain their s- and p-polarization character, respectively. Because the light rays of the return portion of sub-signal 1206A are s-polarized with respect to polarization beam splitter 702, a new sub-signal 1206D comprised of s-polarized light and comprising a large portion of the intensity of sub-signal 1206A is reflected at reflective surface 704. Likewise, because the light of the return portion of sub-signal 1204A are p-polarized with respect to polarization beam splitter 702, a new sub-signal 1204D comprised of p-polarized light and comprising a large portion of the intensity of sub-signal 1204A is transmitted through surface 704, via step 1140.

Both the sub-signals 1204D and 1206D retrace, in the reverse direction, the original paths of sub-signals 1204 and 1206, respectively and are thus directed to and through the second birefringent wedge 720. Upon passing through the second birefringent wedge 720, sub-signals 1204D and 1206D re-trace the same pathways as sub-signals 1204 and 1206, respectively, but in the reverse direction. Furthermore, the light rays of sub-signals 1204D and 1206D have the same respective polarization plane directions as those of sub-signals 1204 and 1206. Thus, in traversing through birefringent wedge 720, both sub-signals 1204D and 1206D are recombined so as to create the output signal 1208. The signal 1208 retraces the original pathway of the incoming or forward propagating portion of signal 1202 and is thus transmitted through and focussed by lens 716. Output fiber 712 is aligned such that the focused signal 1208 is captured by output fiber 712. In this way, most of the intensity of odd-channel signals emanating from input fiber 710 is captured by output fiber 712.

The sub-signals 1204B and 1206B comprise a small portion of signal light intensity. Because sub-signals 1204B and 1206B propagate at small deflection angles relative to sub-signals 1206A and 1204A, respectively, and because the reflective surfaces of non-linear interferometers 722 and 724 are perpendicular to the ray paths of 1206A and 1204A, respectively, the return portions of sub-signals 1204B and 1206B do not re-trace their original paths through polarization beam splitter 702. The change in path, for the return versus the original portion of each of the sub-signals 1204B and 1206B, is such that neither of these sub-signals is captured by either output fiber 708 or 712 regardless of any transmission through or relection at the plane 704. Both sub-signals 1204B and 1206B are thus lost from the system.

Furthermore, because polarization beam splitter 702 is not perfect, a small portion, sub-signal 1206C, of the s-polarized return portion of sub-signal 1206A is transmitted through surface 704 and a small portion, sub-signal 1204C, of the p-polarized return portion of sub-signal 1204A is reflected at surface 704. Both the sub-signal 1206C comprised of s-polarized light and the sub-signal 1204C comprised of p-polarized light travel towards and through the first birefringent wedge plate 718. The first birefringent plate 718 is oriented such that s-polarized and p-polarized rays propagate therethrough as less greatly defected and more greatly defected rays, respectively. Thus, sub-signal 1206C and 1204C propagate through the first birefringent wedge plate 718 as a less greatly deflected ray and as a more greatly deflected ray, respectively. As illustrated in FIG. 12, these ray paths are such that neither sub-signal 1206C nor sub-signal 1204C enter fiber 708. In this way, as well as by the elimination of sub-signals 1204B and 1206B, odd channel signals emanating from input fiber 710 are completely prevented from entering the output fiber 708.

The operation of separator 700 is now discussed with reference to FIG. 13 for even channels input from second input fiber 710. Signal light 1302 of an even channel emanating from fiber 710 is collimated by the lens 716 and then split into two linearly polarized sub-signals, a less greatly defected ray 1304 and a more greatly defected ray 1306, by the second birefringent wedge 720, via step 1110. The optical axes of wedge 720 are aligned such that the light rays of sub-signal 1304 and of sub-signal 1306 have p-polarization and s-polarization, respectively, with reference to the partially reflective surface 704. In this example, the polarization of the ray 1304 is oriented parallel to the bottom edge of the paper and that of the ray 1306 is oriented perpendicular to the plane of the paper. Most of the p-polarized sub-signal ray 1304 is transmitted through surface 704 so as to produce transmitted ray 1304A. Likewise, most of the s-polarized sub-signal ray 1306 is reflected at surface 704 so as to produce reflected ray 1306A. As discussed above, there is also a small portion, sub-signal 1304B, of sub-signal 1304 that is reflected at surface 704 and another small portion, sub-signal 1306B, of sub-signal 1306 that is transmitted through surface 704. Thus, there exist two transmitted sub-signals, 1304A and 1306B and two reflected sub-signals 1306A and 1304B, via step 1120.

Figure 13:
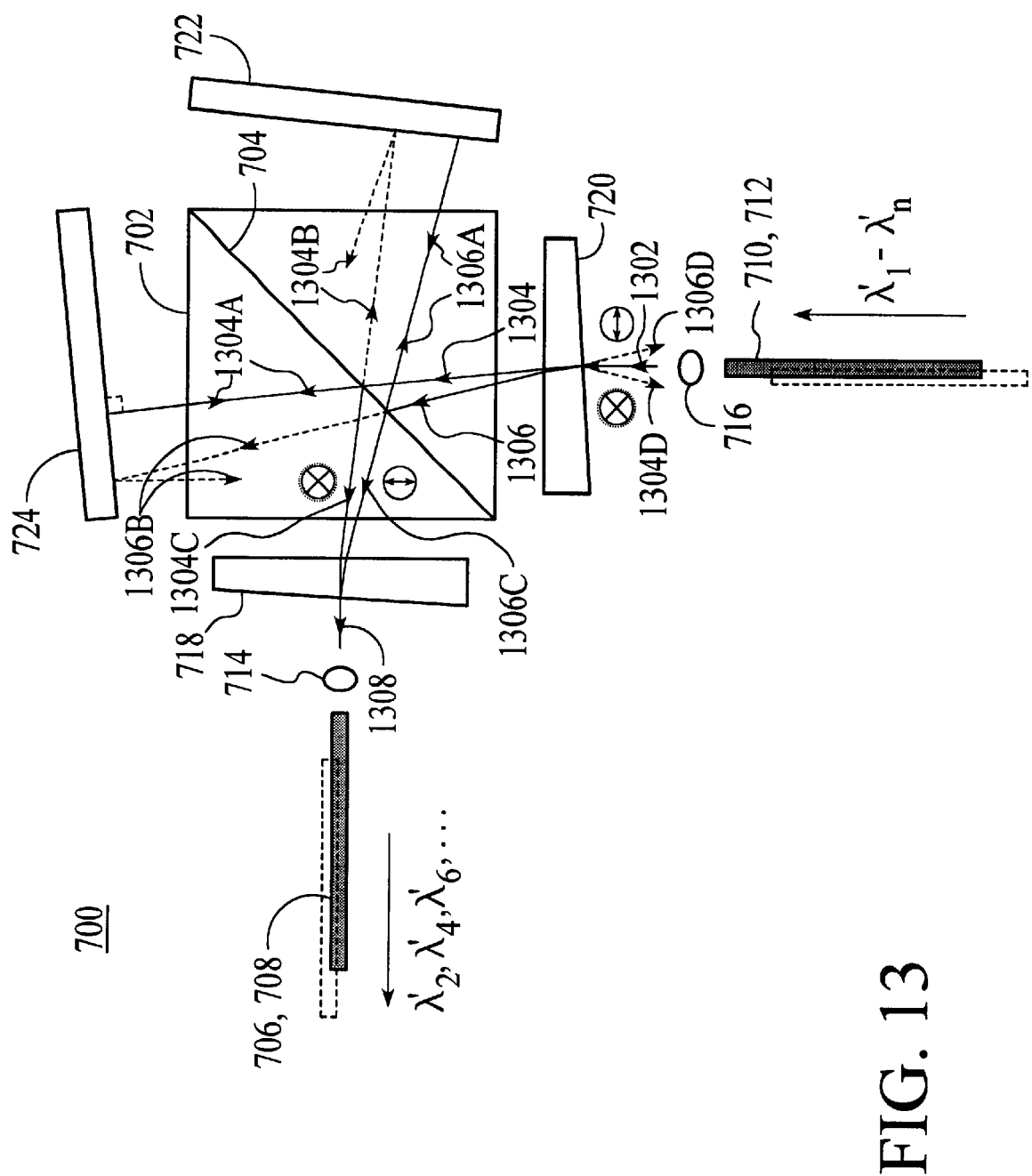
FIG. 13 is an illustration of the optical paths through the preferred embodiment of light signals and sub-signals input from the second input fiber and corresponding to even channels in accordance with the present invention.

As shown in FIG. 13, the two transmitted sub-signals, 1304A and 1306B travel through polarization beam splitter 702 to the second non-linear interferometer 724. The two reflected sub-signals, 1306A and 1304B travel through polarization beam splitter 702 to the first non-linear interferometer 722. Sub-signals 1304A and 1306A, which comprise the bulk of the transmitted intensity and reflected intensity, respectively, have the desired respective p- and s-polarizations appropriate for operation of a perfect polarization beam splitter. Conversely, the weaker intensity sub-signals 1306B and 1304B have undesired s- and p-polarizations, respectively, which result from the imperfect character of beam splitter 702.

Both non-linear interferometers 722 and 724 reflect 100% of the signal light that enters them, via step 1130. After interacting with one or the other of the non-linear interferometers, each of the sub-signals 1304A, 1304B, 1306A, and 1306B therefore propagates along its return or reverse path. The first non-linear interferometer 722 and the second non-linear interferometer 724 are aligned such that their reflective surfaces are perpendicular to the paths of sub-signals 1306A and 1304A, respectively. Therefore, sub-signals 1306A and 1304A are both reflected backward 180° so that their return pathways retrace their respective forward pathways. Because these sub-signals 1306A and 1304A are of an even-channel wavelength, each incurs a 90° polarization-plane rotation upon reflection at its respective interferometer 722 or 724. Thus, after reflection, the light of sub-signal 1306A and 1304A has p- and s-polarization character, respectively. Because the light of the return portion of sub-signal 1306A is p-polarized with respect to polarization beam splitter 702, a new sub-signal 1306C comprised of p-polarized light and comprising a large portion of the intensity of sub-signal 1306A is transmitted through surface 704. Likewise, because the light of the return portion of sub-signal 1304A is s-polarized with respect to polarization beam splitter 702, a new sub-signal 1304C comprised of s-polarized light and comprising a large portion of the intensity of sub-signal 1304A is reflected at surface 704. Both sub-signals 1306C and 1304C are thus directed to and through the first birefringent wedge plate 718. The first birefringent plate 718 is oriented such that p-polarized and s-polarized rays propagate therethrough as more greatly defected and less greatly deflected rays, respectively. Thus, in traversing through first birefringent wedge plate 718, sub-signal 1304C and sub-signal 1306C propagate as a less greatly defected ray and a more greatly deflected ray, respectively. The ray paths of sub-signals 1304C and 1306C are such that these two sub-signals are recombined so as to create the output signal 1308. The signal 1308 is transmitted through and focussed by lens 714. Output fiber 708 is aligned such that the focussed signal 1308 is captured by output fiber 708. In this way, most of the intensity of even-channel signals emanating from input fiber 710 is captured by output fiber 708, via step 1140.

The sub-signals 1304B and 1306B comprise a small portion of signal light intensity. Because sub-signals 1304B and 1306B propagate at small deflection angles relative to sub-signals 1306A and 1304A, respectively, and because the reflective surfaces of non-linear interferometers 722 and 724 are perpendicular to the ray paths of 1306A and 1304A, respectively, the return portions of sub-signals 1304B and 1306B do not re-trace their original paths through polarization beam splitter 702. The change in path, for the return versus the original portion of each of the sub-signals 1304B and 1306B, is such that neither of these sub-signals is captured by either output fiber 708 or 712 regardless of any transmission through or rejection at the plane 704. Both sub-signals 1304B and 1306B are thus lost from the system. Furthermore, because polarization beam splitter 702 is not perfect, a small proportion, sub-signal 1306D, of the p-polarized return portion of sub-signal 1306A is reflected at surface 704 and a small proportion, sub-signal 1304D, of the s-polarized return portion of sub-signal 1304A is transmitted through surface 704. Both the sub-signal 1306D comprised of p-polarized light and the sub-signal 1304D comprised of s-polarized light travel towards and through the second birefringent wedge plate 720. The orientation of wedge plate 720 is such that that p-polarized and s-polarized rays propagate therethrough as less greatly defected and more greatly defected rays, respectively. Thus, sub-signal 1304D and 1306D propagate through the first birefringent wedge plate 718 as a more greatly deflected ray and as a less greatly deflected ray, respectively. As illustrated in FIG. 13, these ray paths are such that neither sub-signal 1304D nor sub-signal 1306D enter fiber 712. In this way, as well as by the elimination of sub-signals 1304B and 1306B, even channel signals emanating from input fiber 710 are completely prevented from entering the output fiber 712.

Figure 14:
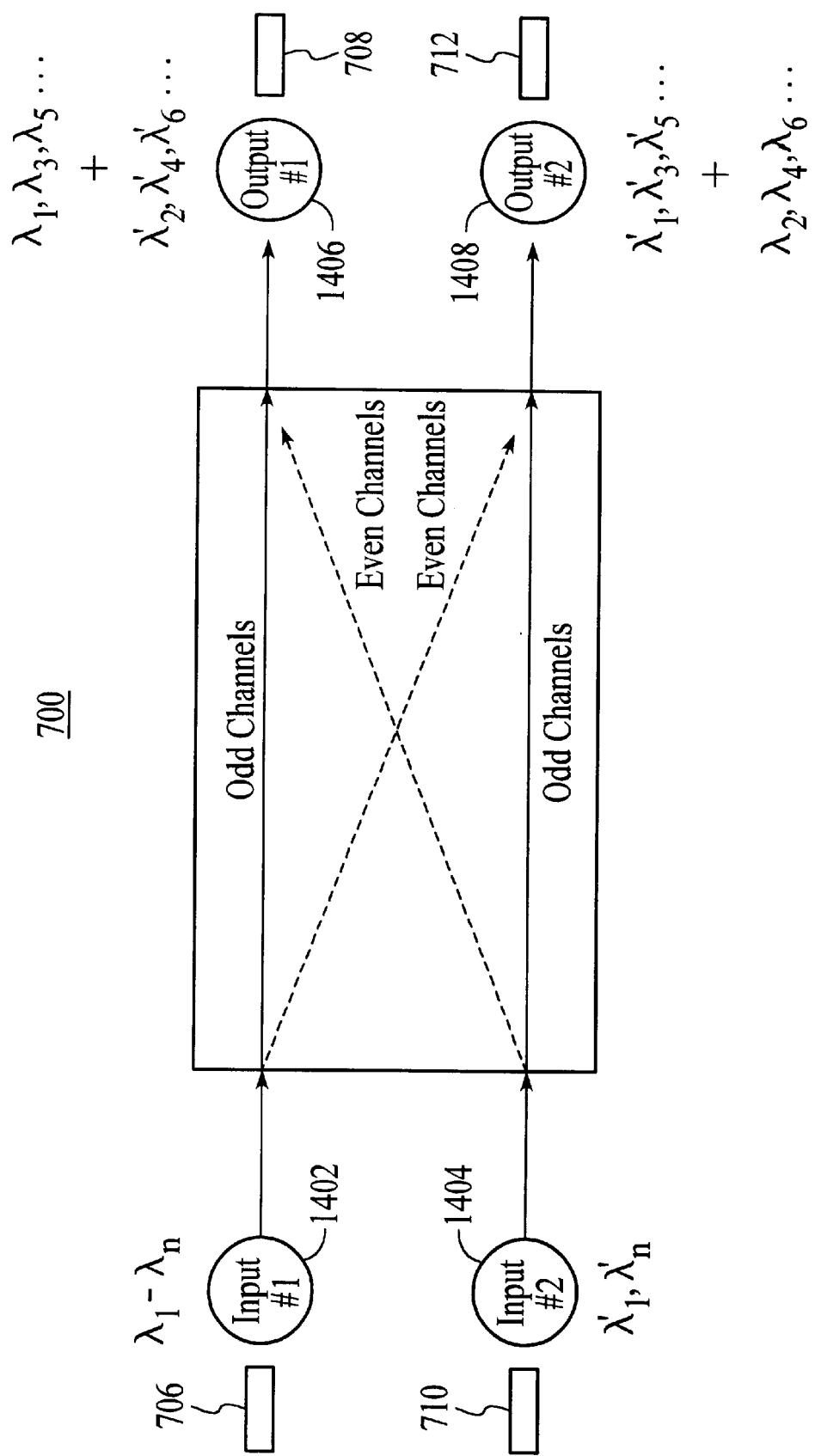
FIG. 14 is a functional signal routing diagram for the separator of the present invention illustrating its functioning as a 2×2 device.

FIG. 14 summarizes the results of the operation of separator 700. Input 1402 is the signal input from the first input fiber 706 and input 1404 is the signal input from the optional second input fiber 710, if present. Output 1406 is the signal output to the first output fiber 708 and output 1408 is the signal output to the second output fiber 712. As discussed above, odd-channel and even-channel signals input to the separator 700 from the first input signal 1402 are directed to the first output fiber 708 as output signal 1406 and the second output fiber 712 as output signal 1408, respectively. Because the discussion of the operation of separator 700 utilizing the second input signal 1404 is identical to that given above for operation utilizing the first input signal 1402, a similar relationship applies in this case. That is, odd-channel and even-channel signals input to the separator 700 from the second input signal 1404 are directed to the second output fiber 712 as output 1408 and the first output fiber 708 as output 1406, respectively. In this way, utilizing either the input signal 1402 or the input signal 1404, the separator 700 functions as a dense wavelength division multiplexer or de-multiplexer which discriminates amongst the pathways of odd and even channels. Because the separation of odd and even channels in separator 700 is based upon an interferometric technique, the inter-channel spacing is strictly periodic in frequency, and thus conforms to standardized channel spacing schemes, such as those recommended by the International Telecommunication Union.

The separator 700 of the present invention has the advantage, relative to separators of conventional wavelength division multiplexers, of a higher tolerance to drifts due to the increase in the widths of the pass bands provided by the non-linear interferometers contained therein. It offers the further advantage, relative to separators and dense wavelength division multiplexers utilizing polarization beam splitters, of a greater efficiency of separation between the sets of separated channels. This latter advantage arises because the degree of physical separation of sub-signal beam paths of differing polarization states is limited by the birefringent wedge plates 718 and 720, and not the polarization beam splitter 702. The efficiency of separation of an unpolarized light beam into a first light beam comprising a first plane polarization direction and a second light beam comprising a second plane polarization direction perpendicular to the first is greater for a birefringent plate than it is for a polarization beam splitter. In the separator 700 of the present invention, the birefringent wedges effect separation of signals into separate sub-signals comprising differently polarized light rays. The polarization beam splitter 702 is utilized so as to direct each of these separated sub-signals, such as sub-signal 904 and 906, to a different non-linear interferometer. Because of the geometry of the device 700, any sub-signal "leakage" caused by polarization beam splitter 702—that is, reflection of a sub-signal at plane 704 that is nominally passed straight therethrough or passage straight through plane 704 of a sub-signal that is nominally reflected thereat—is eliminated. Thus, the separator of the present invention provides a greater efficiency of isolation, relative to other separators and wavelength division multiplexers utilizing polarization beam splitters, of one set of separated channels from another.

An added functionality and advantage of the separator 700 of the present invention is the ability to perform the add/drop function while also separating the channels. As illustrated in FIG. 14, two signals, a first input signal 1402 containing channel signals $\lambda_1$–$\lambda_n$ and a second input signal 1404 containing channel signals $\lambda_1'$–$\lambda_n'$ are both input into the separator 700. Device 700 could then drop the even channels of the first signal to the second signal while adding the even channels of the second signal to the first signal. For instance, as shown in FIG. 14, the first output signal 1406 would consist of the odd channels ($\lambda_1, \lambda_3, \lambda_5$ . . . ) from the first input signal 1402 plus the even channels ($\lambda_2', \lambda_4', \lambda_6'$ . . . ) from the second input signal 1404. In like fashion, the second output signal 1408 would consist of the odd channels ($\lambda_1', \lambda_3', \lambda_5'$ . . . ) from the second input signal 1404 plus the even channels ($\lambda_2, \lambda_4, \lambda_6$ . . . ) from the first input signal 1402.

Figure 15:
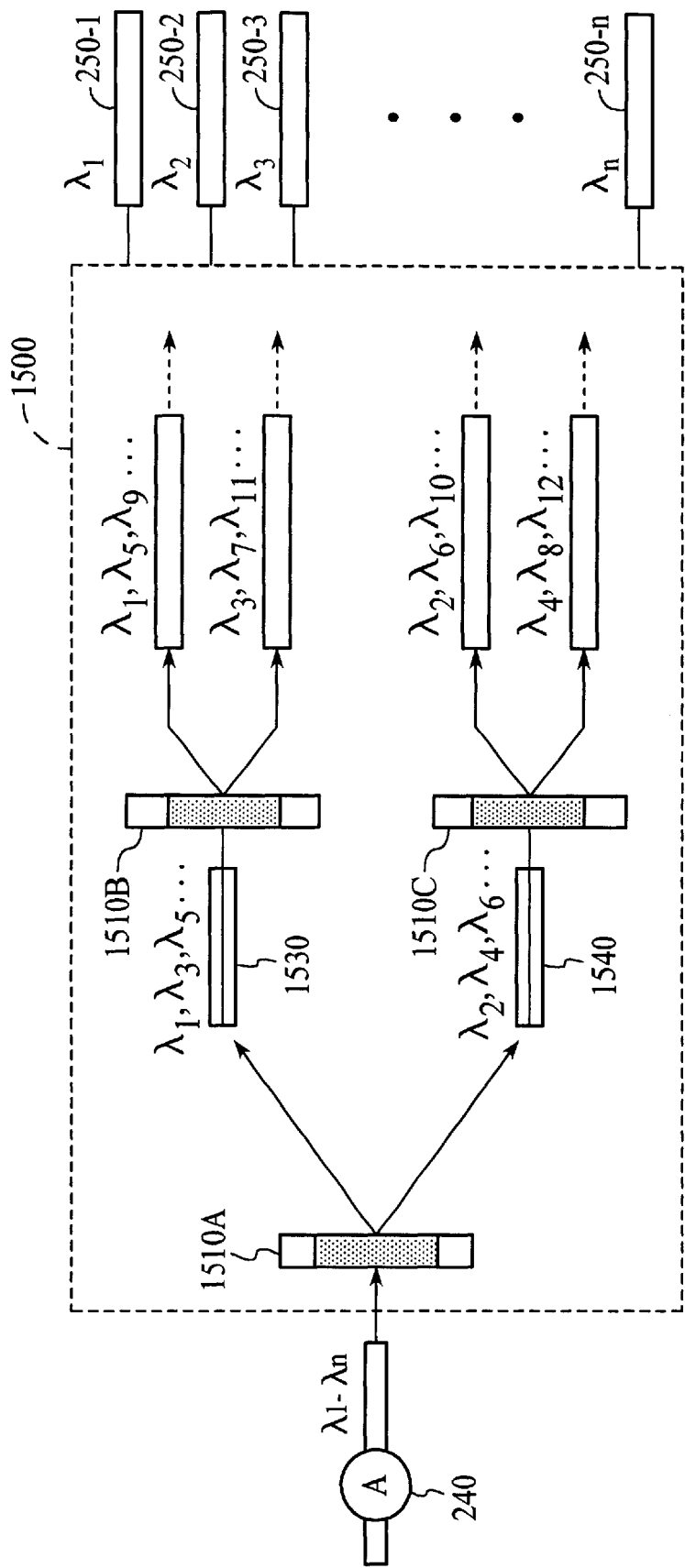
FIG. 15 is a simple block diagram of a wavelength division multiplexer with a multi-stage parallel cascade configuration of separators in accordance with the present invention.

Another advantage of the separator 700 of the present invention is the ability to place it within a multi-stage parallel cascade configuration to reduce insertion loss as part of a larger dense wavelength division multiplexer. This configuration is illustrated in FIG. 15 and has been disclosed in co-pending U.S. Patent Application entitled "Fiber Optic Dense Wavelength Division Multiplexer Utilizing a Multi-Stage Parallel Cascade Method of Wavelength Separation," Ser. No. 09/130,386, filed on Aug. 6, 1998. Applicant hereby incorporates this application by reference. In FIG. 15, an optical signal containing channels $\lambda_1$–$\lambda_n$ enters the dense wavelength division multiplexer 1500 of the present invention through Node A 240. The signal passes through a separator of the present invention 1510A. The separator 1510A divides the signal into two separate signals, one containing the odd channels ($\lambda_1, \lambda_3, \lambda_5$ . . . ) (1530) and the other containing the even channels ($\lambda_2, \lambda_4, \lambda_6$ . . . ) (1540) as described above. These odd and even channels are each passed through another separator, 1510B and 1510C, respectively, which further divides them by every other channel. The separator 1510B, and specifically the set of non-linear interferometers comprising this separator, is modified so as to separate the set of channels $\lambda_1, \lambda_5, \lambda_9$ . . . from the set of channels $\lambda_3, \lambda_7, \lambda_{11}$ . . . through adjustment of the wavelength spacing of channels whose polarization directions are rotated. Likewise, the separator 1510C, and specifically the set of non-linear interferometers comprising this separator, is modified so as to separate the set of channels $\lambda_2, \lambda_6, \lambda_{10}$ . . . from the set of channels $\lambda_4, \lambda_8, \lambda_{12}$ . . . through a similar adjustment. Similar channel division continues until only one channel is outputted to each optical fiber 250-1 through 250-$n$. In a dense wavelength division multiplexer constructed according to the multi-stage parallel cascade configuration of the present invention, there is no decrease in pass band widths relative to those of the channel separator 1510A in the first stage. This is in contrast to and an advantage over conventional filter technologies which, when concatenated in series as part of a larger optical device, cause a decrease in overall pass band width of the filter ensemble relative to any individual filter. The present invention is thus free of the increased insertion losses associated with such reduced pass band widths. Although the separator of the present invention has been described as being utilized with the multi-stage parallel cascade configuration of the present invention, one of ordinary skill in the art will understand that the separator of the present invention may be utilized with other configurations without departing from the spirit and scope of the present invention.

An improved separation mechanism to be used in a dense wavelength division multiplexer has been disclosed. The separator of the present invention includes a mechanism of inputting an optical signal where the optical signal consists of a plurality of optical channels; a mechanism of separating one or more of the plurality of optical channels by introducing a phase difference between at least two of the channels of the optical signal; and a mechanism of outputting the separated plurality of channels along a plurality of optical paths. The mechanism of separating one or more of the plurality of optical channels includes birefringent beam separation and recombination plates, a polarization beam splitter and two non-linear interferometers, with the birefringent plates disposed between the polarization beam splitter and the input and output paths and the two non-linear interferometers disposed on opposite sides of the polarization beam splitter from the input and output paths.

The present invention provides an ease in alignment and a higher tolerance to drifts due to the increase in the widths of the pass bands and also provides an improved separation of channels relative to other wavelength division multiplexers employing polarization beam splitters. It may also be easily modified to perform the add/drop function as it separates channels. The materials required to manufacture and implement the dense wavelength division multiplexer in accordance with the present invention are readily available. The present invention thus does not require special or expensive materials or processes. It is thus cost effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division multiplexer for separating an optical signal into optical channels, comprising:
   at least one birefringent plate for receiving the optical signal; and
   a polarization beam splitter optically coupled to the at least one birefringent plate, the polarization beam splitter and at least one birefringent plate for separating one or more of the plurality of optical channels by introducing a phase difference between at least two of the plurality of optical channels, wherein the separating is based on the polarity of the plurality of optical channels.

2. The dense wavelength division multiplexer of claim 1, further comprising a means for inputting the optical signal, comprising:
   at least one lens optically coupled to the at least one birefringent plate; and
   at least one optic fiber optically coupled to the lens.

3. The dense wavelength division multiplexer of claim 1, further comprising a means for outputting the separated plurality of optical channels, comprising:
   at least one lens optically coupled to the at least one birefringent plate; and
   at least two optic fibers optically coupled to the lens.

4. The dense wavelength division multiplexer of claim 1, further comprising:
   at least two nonlinear interferometers optically coupled to the polarization beam splitter.

5. The dense wavelength division multiplexer of claim 4, wherein the nonlinear interferometers each comprise:
   a first glass plate optically coupled to a second glass plate, forming a cavity;
   a first reflective coating residing inside the cavity and on the second glass plate;
   a second reflective coating residing inside the cavity and on the first glass plate;
   a first waveplate residing inside the cavity between the first and second glass plates; and
   a second waveplate residing outside the cavity and optically coupled to the first glass plate.

6. The dense wavelength division multiplexer of claim 5, wherein the first reflective coating comprises a reflective coating with a reflectivity of 100%.

7. The dense wavelength division multiplexer of claim 5, wherein the second reflective coating comprises a reflective coating with a reflectivity of approximately 18%.

8. The dense wavelength division multiplexer of claim 5, wherein the first waveplate comprises a $\lambda/4$ waveplate.

9. The dense wavelength division multiplexer of claim 5, wherein the second waveplate comprises a $\lambda/8$ waveplate.

10. A dense wavelength division multiplexer for separating an optical signal into optical channels comprising:
    means for inputting an optical signal, the optical signal comprising a plurality of optical channels;
    means for outputting a plurality of optical channels separated from the optical signal along a plurality of optical paths;
    a polarization beam splitter;
    at least two nonlinear interferometers optically coupled to the polarization beam splitter; and
    at least one birefringent wedge plate optically coupled between the polarization beam splitter and either the inputting means or the outputting means.

11. The dense wavelength division multiplexer of claim 10, wherein the nonlinear interferometers each comprise:
    a first glass plate optically coupled to a second glass plate, forming a cavity;
    a first reflective coating residing inside the cavity and on the second glass plate;
    a second reflective coating residing inside the cavity and on the first glass plate;
    a first waveplate residing inside the cavity between the first and second glass plates; and
    a second waveplate residing outside the cavity.

12. The dense wavelength division multiplexer of claim 11, wherein the first reflective coating comprises a reflective coating with a reflectivity of 100%.

13. The dense wavelength division multiplexer of claim 11, wherein the second reflective coating comprises a reflective coating with a reflectivity of approximately 18%.

14. The dense wavelength division multiplexer of claim 11, wherein the first waveplate comprises $\lambda/4$ waveplate.

15. The dense wavelength division multiplexer of claim 11, wherein the second waveplate comprises a $\lambda/8$ waveplate.

16. A dense wavelength division multiplexer for separating an optical signal into optical channels comprising:
    at least one of a first optic fiber for inputting an optical signal, the optical signal comprising a plurality of optical channels;
    at least one of a first lens optically coupled to the first optic fiber;
    at least two of a second optic fiber for outputting one or more optical channels, wherein at least one of the second optic fibers is optically coupled to the first lens;
    at least one of a second lens optically coupled to the second optic fibers which are not optically coupled to the first lens;
    a polarization beam splitter;
    a first birefringent wedge plate optically coupled between the polarization beam splitter and the first lens;
    a second birefringent wedge plate optically coupled between the polarization beam splitter and the second lens; and
    at least two nonlinear interferometers optically coupled to the polarization beam splitter at opposite sides of the polarization beam splitter than the first and second optical fibers.

17. The dense wavelength division multiplexer of claim 16, wherein the nonlinear interferometers each comprise:
    a first glass plate optically coupled to a second glass plate, forming a cavity;
    a first reflective coating residing inside the cavity and on the second glass plate;

a second reflective coating residing inside the cavity and on the first glass plate;

a first waveplate residing inside the cavity between the first and second glass plates; and a second waveplate residing outside the cavity.

18. The dense wavelength division multiplexer of claim 17, wherein the first reflective coating comprises a reflective coating with a reflectivity of 100%.

19. The dense wavelength division multiplexer of claim 17, wherein the second reflective coating comprises a reflective coating with a reflectivity of approximately 18%.

20. The dense wavelength division multiplexer of claim 17, wherein the first waveplate comprises a $\lambda/4$ waveplate.

21. The dense wavelength multiplexer of claim 17, wherein the second waveplate comprises a $\lambda/8$ waveplate.

22. A method for separating an optical signal into optical channels, comprising the steps of:

(a) splitting the optical signal into a plurality of plane polarized sub-signals;

(b) directing each of the plurality of plane polarized sub-signals based upon their polarity;

(c) reflecting the plurality of directed plane polarized sub-signals; and (d) combing at least two of the plurality of directed and reflected plane polarized sub-signals.

23. The method of claim 22, wherein the splitting step (a) is performed by a first birefringent plate.

24. The method of claim 22, wherein the directing step (b) is performed by a polarization beam splitter.

25. The method of claim 22, wherein the reflecting step (c) is performed by a plurality of nonlinear interferometers.

26. The method of claim 22, wherein the combining step (d) is performed by a second birefringent plate.

27. A system for separating an optical signal into optical channels, comprising:

a plurality of optical fibers for carrying the optical signal or a portion thereof; and a dense wavelength division multiplexer comprising a plurality of separators at least partly in a multi-stage parallel cascade configuration, each separator comprising:

at least one birefringent plate for receiving the optical signal; and a polarization beam splitter optically coupled to the at least one birefringent plate, the polarization beam splitter and at least one birefringent plate for separating one or more of the plurality of optical channels by introducing a phase difference between at least two of the plurality of optical channels, wherein the separating is based on the polarity of the plurality of optical channels.

28. The system of claim 27, further comprising:

at least two nonlinear interferometers optically coupled to the polarization beam splitter.

* * * * *